(12) United States Patent
Matsushima

(10) Patent No.: US 7,019,860 B2
(45) Date of Patent: Mar. 28, 2006

(54) METHOD OF AND APPARATUS FOR FORMING AN IMAGE, AND COMPUTER PROGRAM

(75) Inventor: Hiroyuki Matsushima, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 908 days.

(21) Appl. No.: 09/985,484

(22) Filed: Nov. 5, 2001

(65) Prior Publication Data

US 2002/0080398 A1 Jun. 27, 2002

(30) Foreign Application Priority Data

Nov. 6, 2000 (JP) ............................. 2000-338217
Mar. 28, 2001 (JP) ............................. 2001-094343

(51) Int. Cl.
*G06F 15/00* (2006.01)
*H04M 11/00* (2006.01)

(52) U.S. Cl. ............. 358/1.15; 379/93.24; 379/100.08; 358/1.16; 358/1.1

(58) Field of Classification Search ............... 358/1.15, 358/1.1, 1.16, 402; 725/112; 719/321; 710/52; 709/217, 219, 206; 345/689; 379/93.24, 379/100.08

See application file for complete search history.

(56) References Cited

U.S. PATENT DOCUMENTS 5,675,782 A * 10/1997 Montague et al. .......... 713/201
5,768,483 A    6/1998 Maniwa et al.
5,768,486 A    6/1998 Sugaya
6,362,894 B1 * 3/2002 Shima .......................... 358/1.15
2002/0004802 A1 * 1/2002 Shima .......................... 707/513

FOREIGN PATENT DOCUMENTS

EP     0 971 287     1/2000

OTHER PUBLICATIONS

Wang, Zheng; Crowcroft, Jon; "Prefetching in World Wide Web", Global Telecommunications Conference, 1996. GLOBECOM '96. 'Communications: The Key to Global Prosperity' Nov. 18-22, 1996, pp.: 28-32.*
Hard Copy Observer vol. 6 No. 9, pp. 45, 24-26, XP-002935645, "Pipeline's Internet Printing System Lets the Printer Surf the Web", Mar., 1197.*
Patent Abstracts of Japan, JP 2000-112691, Apr. 21, 2000.
Patent Abstracts of Japan, JP 11-312068, Nov. 9, 1999.
Hard Copy Observer, vol. 6, No. 9, pp. 45, 24-26, XP-002935645, "Pipeline's Internet Printing System Lets the Printer Surf the Web", Mar., 1997.
Z. Wang, et al., IEEE, Global Telecommunications Conferenc, pp. 28-32, XP-01022016, Prefetching in World Wide Web, Nov. 18, 1996.

* cited by examiner

*Primary Examiner*—Kimberly Williams
*Assistant Examiner*—Thomas J. Lett
(74) *Attorney, Agent, or Firm*—Oblon, Spivak, McClelland, Maier & Neustadt, P.C.

(57) ABSTRACT

The network printer obtains information from a Web page over the network, and stores this obtained information together with a URL thereof and the time when this information was received into the storage. When a print request from the outside via a console panel is made, the network printer reads data of an assigned URL from the storage, and prints this data using the printer engine.

24 Claims, 18 Drawing Sheets

| | |
|---|---|
| http:www.xxx-news.com/ | 1999.11.26 21:00 |
| http:www.xxx-news.com/ | 1999.11.25 21:00 |
| http:www.xxx-news.com/ | 1999.11.24 21:00 |
| http:www.xxx-news.com/ | 1999.11.22 21:00 |
| http:www.xxxx.co.jp/ | 1999.11.22 21:00 |

FIG.9

ACCUMULATED-INFORMATION LIST

| Select 1 | URL | RECEIVING TIME |
|---|---|---|
| ● | http://www.xxx-news.com/ | 1999.11.26 21:00 |
| ○ | http://www.xxx-news.com/ | 1999.11.25 21:00 |
| ○ | http://www.xxx-news.com/ | 1999.11.24 21:00 |
| ○ | http://www.xxx-news.com/ | 1999.11.22 21:00 |
| ○ | http://www.xxxx.co.jp/ | 1999.11.22 21:00 |

PRINT
↳ 33

| news@xxx-news.com | 1999.11.29 | 2:00 |
| news@xxx-news.com | 1999.11.26 | 2:00 |
| news@xxx-news.com | 1999.11.25 | 2:00 |
| news@xxx-news.com | 1999.11.24 | 2:00 |
| info@xxxx.co.jp | 1999.11.19 | 2:00 |

METHOD OF AND APPARATUS FOR FORMING AN IMAGE, AND COMPUTER PROGRAM

FIELD OF THE INVENTION

The present invention relates to a method of and an apparatus for forming an image and capable of collecting information via the Internet and printing the collected information, and a computer program for making a computer execute this method.

BACKGROUND OF THE INVENTION

Along the recent development in the Internet, it has become common to collect information by utilizing E-mails, net news, and WWW (World Wide Web) as distributed systems on the Internet.

The E-mails and the net news employ what is called a push-type information providing mode. Specifically, based on the registration of E-mail addresses in advance, information is periodically distributed to users as E-mails or net news. The WWW employs what is called a pull-type information providing mode. Specifically, users make access to a specific HTTP service by using browsers, and obtain information.

As an information collection technique using this WWW, there exists a software for storing a WWW page of an HTTP server positioned at a specific IP address automatically and periodically onto a hard disc of a PC. When this conventional technique is used, a user can have a desired WWW page downloaded from a desired HTTP server, and read this WWW page in off-line.

However, such conventional techniques are suitable for PCs that have a network connection function and a relatively large display screen, and are not suitable for PDAs that have a small display screen. Therefore, in many cases, when information has been collected using the PDA, a user can have the information printed on a sheet of paper using an image formation apparatus like a printer, and then confirm the contents. Consequently, this has a problem in that it takes time to confirm the information.

Further, when only an image formation apparatus, for example the facsimile, is placed in a work place, it is not possible to collect information via the Internet by using the conventional techniques. Therefore, there is also a problem that it is not possible to confirm desired information.

In view of the above, it is extremely important to efficiently realize an image formation apparatus capable of collecting information via the Internet and capable of printing the collected information.

SUMMARY OF THE INVENTION

It is an object of the present invention to provide a method of and an apparatus for forming an image and capable of collecting information via the Internet and printing the collected information, and a computer program for making a computer execute this method.

According to the method of and the apparatus for forming an image, and the computer program relating to one aspect of this invention, information is obtained from the network via the network interface, and the information is stored in the information storage. When a request for printing has been received from the outside, the information stored in the information storage is printed with the printer engine. Therefore, it is possible to collect information on the network and print this information, without utilizing a PC or a PDA.

According to another aspect of the present invention the image formation apparatus comprises: hardware resources including one or more of a display section, a printing section, a storage section, and an image pick-up section that are used for forming an image, and provides user services of an image formation processing using a printer, a copy machine, and a facsimile unit. The image formation apparatus comprises a platform capable of loading thereon a plurality of applications for providing own image formation processing to each of the user services using the printer, the copying machine, and the facsimile unit, the platform located between the applications and the hardware resources, for controlling the management and execution of the hardware resources that are carried out in common to the plurality of applications that can be loaded at the time of providing the user services. The platform comprises: an information obtaining module which obtains information from the network via the network interface; a memory control module which stores the information obtained by the information obtaining module into the storage section; and an engine control module which prints, using the printing section, information stored in the storage section that has been requested for printing, when the information printing request has been received from the network.

Other objects and features of this invention will become apparent from the following description with reference to the accompanying drawings.

BRIEF DESCRIPTION OF THE DRAWINGS

FIG. 9 is top plan view showing an example of a screen display of data that the network printer transmits to a user's WWW browser;

DETAILED DESCRIPTION

Embodiments of the method of and an apparatus for forming an image, and a computer program for realizing the method according to the present invention on a computer will be explained in detail below with reference to the accompanying drawings.

Figure 1:
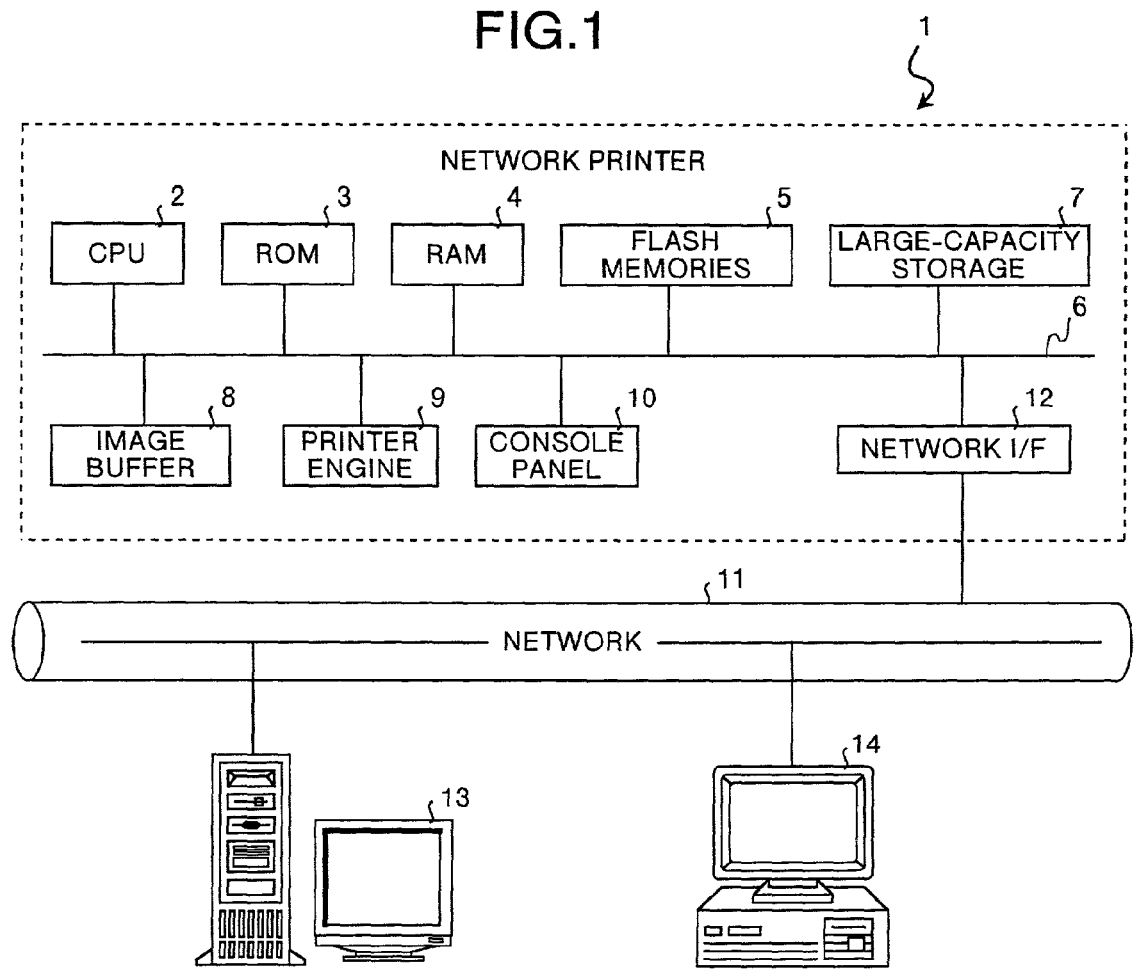
FIG. 1 is a block diagram showing an electric connection of a network printer as a first embodiment of this invention.

FIG. 1 is a block diagram showing an electric connection of a network printer 1 as the first embodiment of this invention. This network printer 1 is an example of the image formation apparatus of this invention. As shown in FIG. 1, the network printer 1 has a CPU 2 for carrying out various kinds of processing and integrally controlling each section, a ROM 3 for storing various kinds of computer programs, a RAM 4 as a work area for the CPU 2, flash memories 5 as second and third memories for storing various kinds of set information, and a network interface 12 for carrying out communications with the network 11, connected to each other with a bus 6.

The bus 6 is also connected with a large-capacity storage 7 as a first memory like that for a hard disk drive, an image buffer 8 for extending a bit image for printing, a printer engine 9 for printing an image written in the image buffer 8 according to an electronic photographing system or other printing system, and a console panel 10 equipped with various kinds of keys for receiving various kinds of operation from users and an LCD for displaying various kinds of messages, via a predetermined interface and an I/O. The network 11 is connected with a server (a WWW server) 13, and a terminal 14 like a PC.

Figure 2:
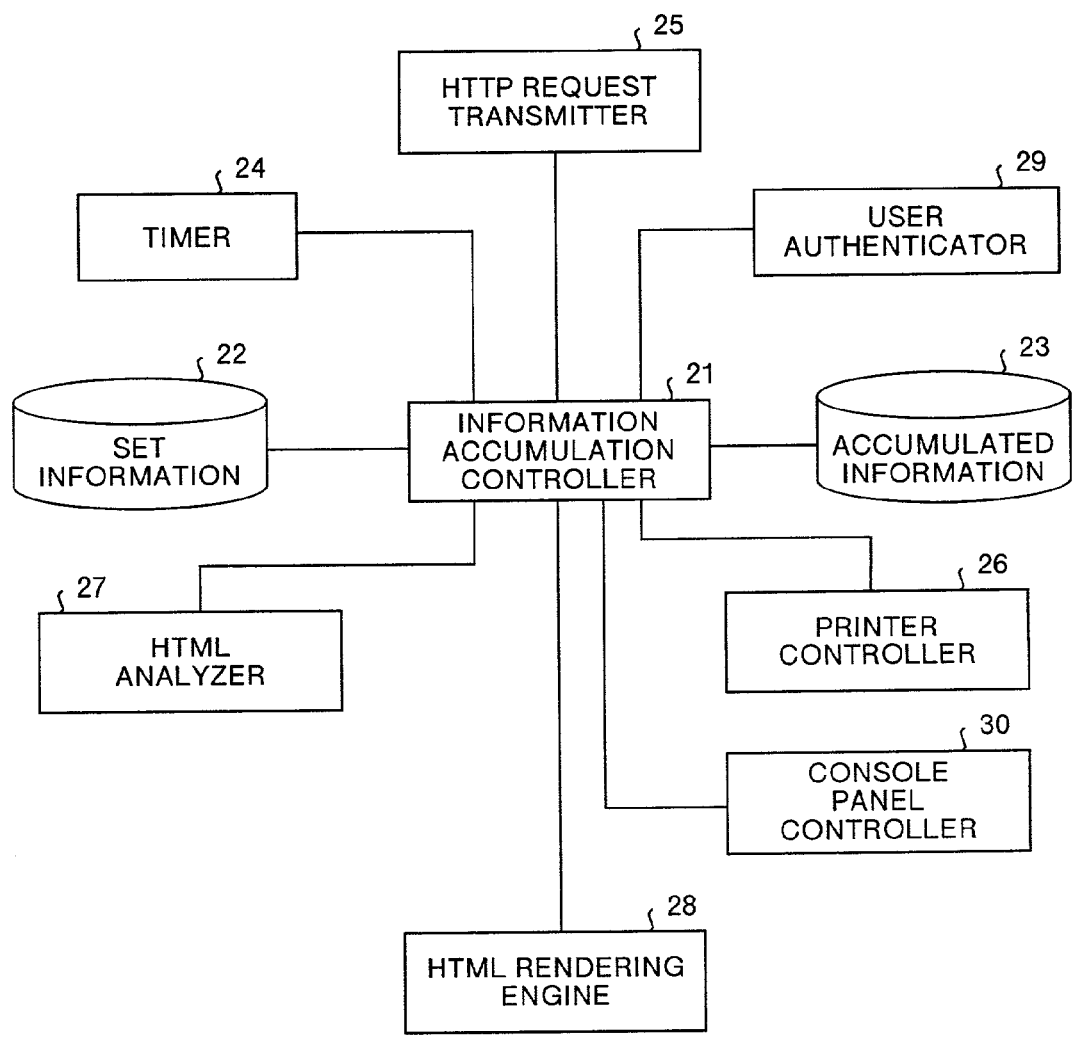
FIG. 2 is a functional block diagram for explaining a processing that the network printer executes according to a control program stored in a ROM.

FIG. 2 is a functional block diagram for explaining a processing that the network printer 1 executes according to a control program stored in the ROM 3. As shown in FIG. 2, an information accumulation controller 21 collects information from WWW pages on the network 11, and stores the collected information into the large-capacity storage 7.

Set information 22 is information to be used for the processing executed by the information accumulation controller 21, and this information is stored in the flash memories 5. The set information 22 includes a URL of a WWW page from which information is to be collected on the network 11, a time and interval for making access to WWW pages, a flag (an image storage flag) showing whether an image included on the WWW page is to be accumulated in the large-capacity storage 7 or not, a value (an accumulation maximum layer) showing whether a page indicated by a hyperlink included on the WWW page is to be accumulated extending over several layers in the large-capacity storage 7 or not, and a user ID and a password for authentication in the case of referring to an assigned WWW page. For example, when a typical new information site has been assigned, the time for checking the updating of this WWW page is at 24:00. In this case, the checking is carried out at every 24 hours. Further, as it is not necessary to follow a link, 1 is assigned as a hierarchy.

Accumulated information 23 includes a URL of WWW pages and images collected on the network 11, collected (accumulated) dates and times, and pages (HTML) and image data, and this information is stored in the large-capacity storage 7.

A timer 24 provides time information to the information accumulation controller 21. An HTTP request transmitter 25 transmits an HTTP request of a URL assigned by the information accumulation controller 21. A printer controller 26 prints an image by controlling the printer engine 9 according to an assignment from the information accumulation controller 21.

A HTML analyzer 27 analyzes the HTML of a received WWW page. A HTML rendering engine 28 analyzes the HTML of a received WWW page, and develops the WWW page into bit map data that can be printed with the printer engine 9.

A user authenticator 29 collates a password input with the console panel 10 with a password stored in the set information 22. A console panel controller 30 controls the console panel 10.

When a firewall has been built up, the printer may not collect information directly from the external server 13, but may be structured to be connected to the external server 13 via a proxy server that operates on a separate workstation connected to the network.

Next, the processes carried out by the network printer will be explained in detail with reference to the flowcharts shown in FIG. 3 to FIG. 5.

Figure 3:
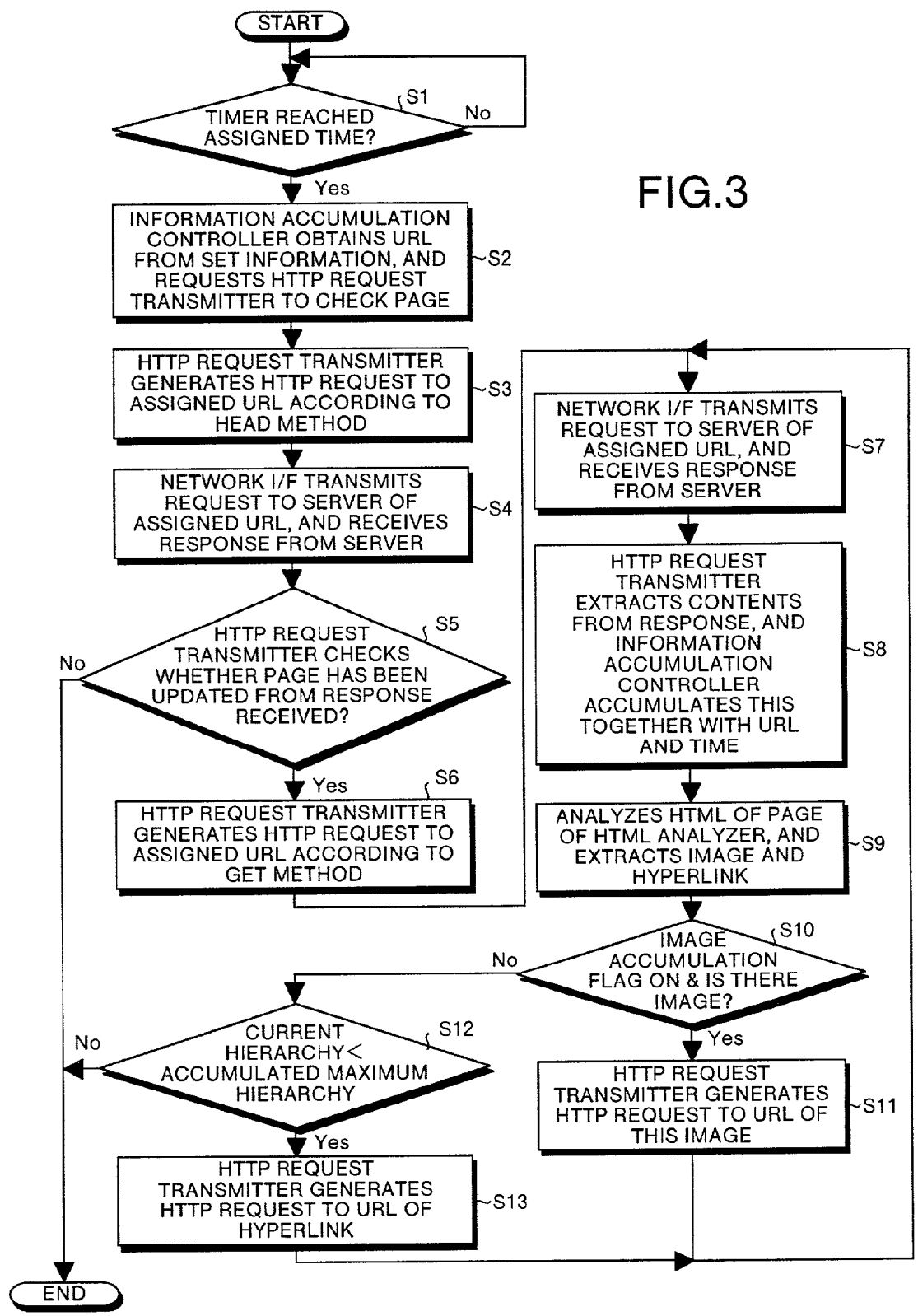
FIG. 3 is a flowchart for explaining a detailed processing procedure that the network printer carries out.

When the time of the timer 24 has reached a time for making access to a WWW page as fetching-timing information included in the set information 22 (YES at step S1), the network printer 1 starts the processing shown in FIG. 3. First, the information accumulation controller 21 obtains a URL as the fetching-target information included in the set information 22, and requests the HTTP request transmitter 25 to check a predetermined WWW page (step S2).

The HTTP request transmitter 25 generates an HTTP request to an assigned URL according to a HEAD method (step S3), and the network I/F 12 transmits the HTTP request to the WWW server 13 of the assigned URL, and receives a response from the WWW server 13 (step S4).

The HTTP request transmitter 25 checks whether the WWW page has been updated or not, from the response received from the WWW server 13. When the WWW page has not been updated (NO at step S5), the HTTP request transmitter 25 finishes the processing. When the WWW page has been updated (YES at step S5), the HTTP request transmitter 25 generates an HTTP request to the assigned URL according to a GET method (step S6). The network I/F 12 transmits the HTTP request to the WWW server 13 of the assigned URL, and receives a response from the WWW server 13 (step S7).

The HTTP request transmitter 25 extracts contents from the response, and the information accumulation controller 21 accumulates the contents together with the URL and the receiving time as the accumulated information 23 (step S8). The HTTP request transmitter 25 then analyzes the HTML of the WWW page received by the HTML analyzer 27, and extracts the image and the hyperlink (step S9).

When the image accumulation flag of the set information 22 is ON, and also when there is still the image (YES at step S10), the HTTP request transmitter 25 generates an HTTP request to the URL of this image (step S11), and returns to the step S7. When the image accumulation flag of the set information 22 is OFF, or when the image has not been extracted at step S9 (NO at step S10), the HTTP request transmitter 25 compares the current hierarchy with the accumulation maximum hierarchy of the set information 22 (step S12). When the current hierarchy is smaller than the accumulation maximum hierarchy (YES at step S12), the HTTP request transmitter 25 generates an HTTP request to the URL of the hyperlink (step S13), returns to step S7, and checks other hierarchy. When the current hierarchy has reached the accumulation maximum hierarchy (NO at step S12), the HTTP request transmitter 25 finishes the processing.

Figure 4:
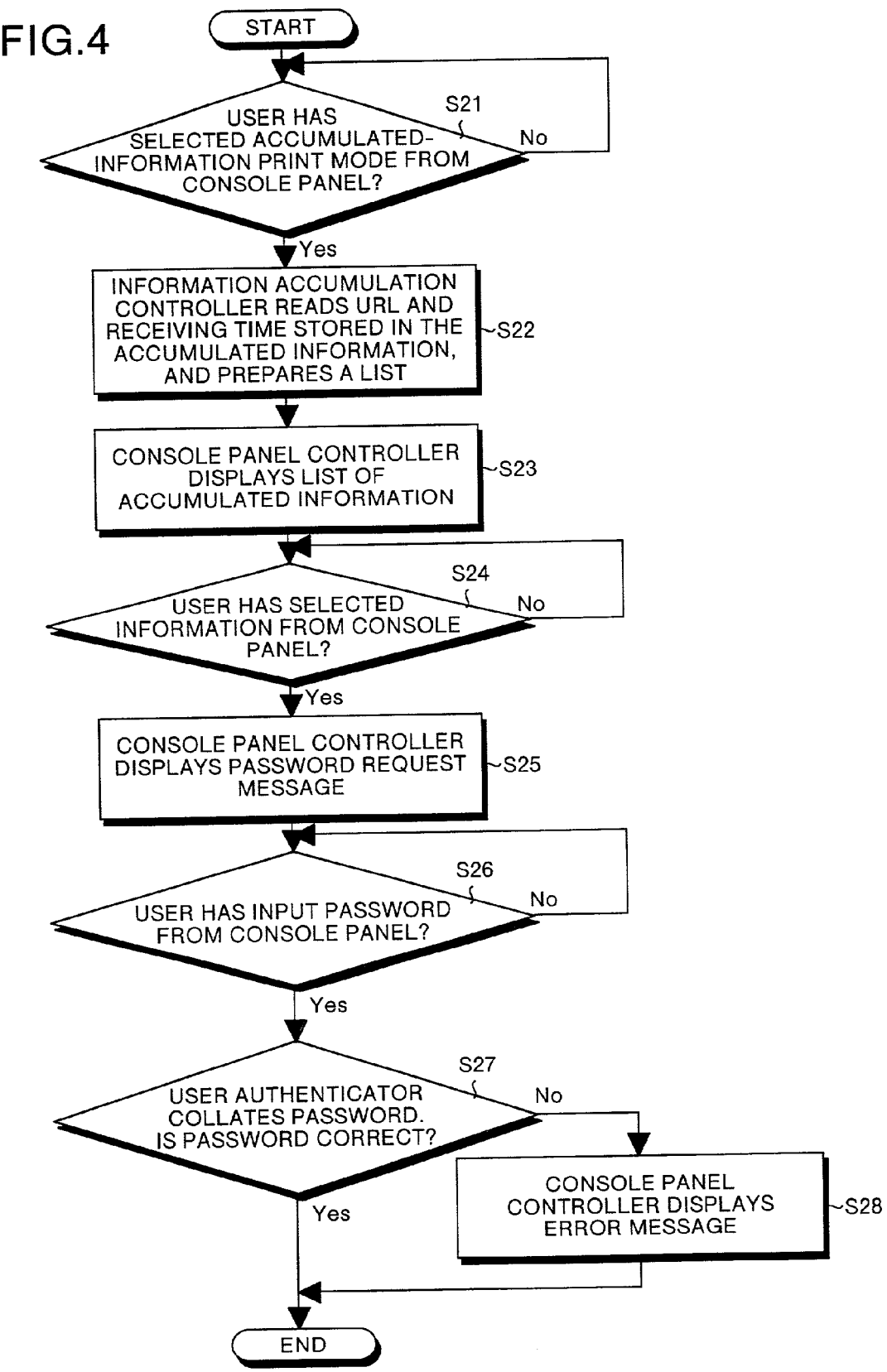
FIG. 4 is a flowchart for explaining a detailed processing procedure that the network printer carries out.

As shown in FIG. 4, when the user has operated the console panel 10 and selected an accumulated-information print mode (YES at step S21), the network printer 1 starts the processing shown in FIG. 4. Namely, the information accumulation controller 21 reads the fetching-target URL and the receiving time stored in the accumulated information 23 (the information accumulated at step S8), and prepares a list of this information (step S22). Then, the console panel controller 30 displays the list on the LCD of the console panel 10 (step S23).

Figures 6, 7:
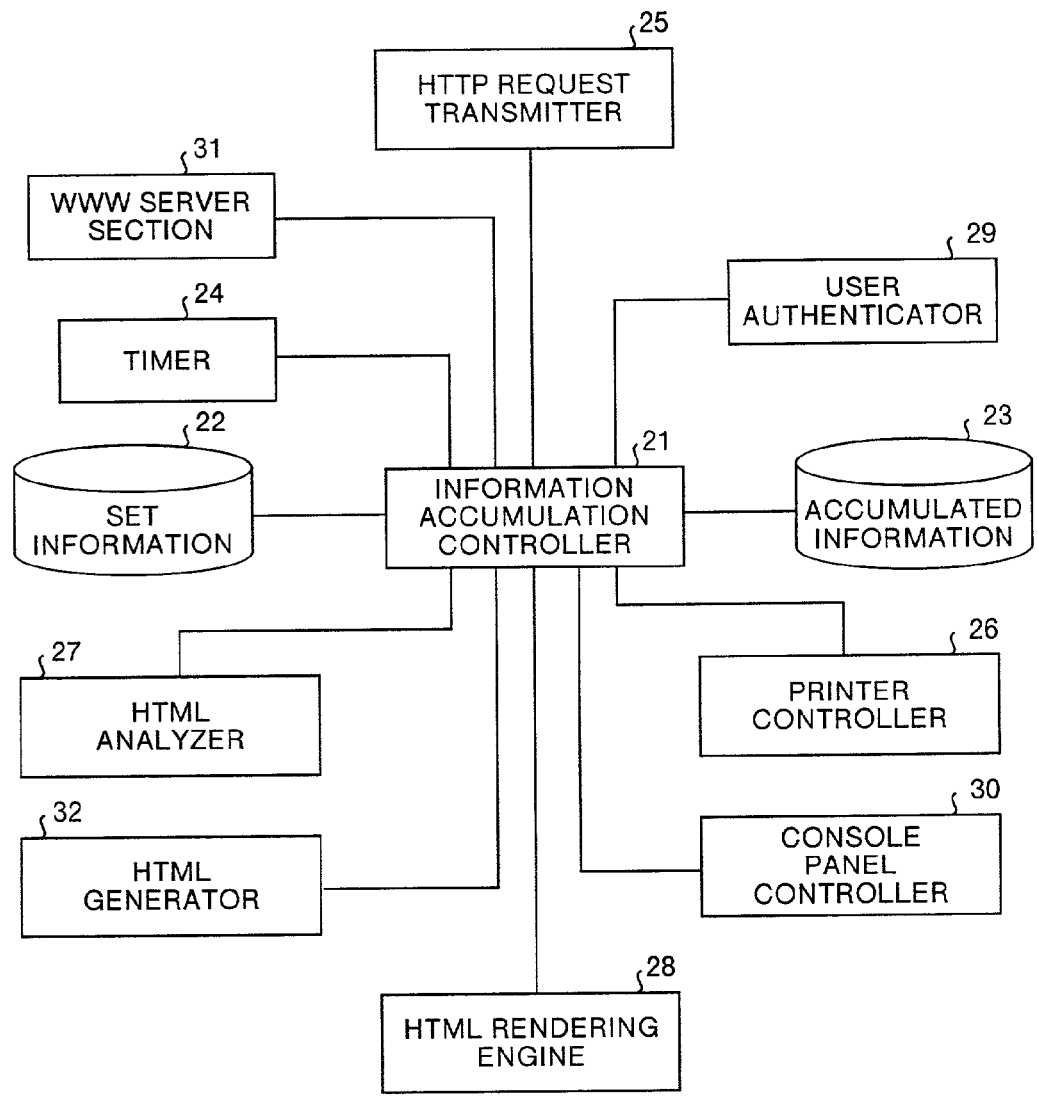
FIG. 6 is a top plan view showing one example of a screen display on a console panel of the network printer.
FIG. 7 is a functional block diagram for explaining a processing that the network printer executes according to a control program stored in a ROM according to a second embodiment of this invention.

FIG. 6 shows one example of this image display. In the example of FIG. 6, a URL is shown on the left side, and a receiving time is shown on the right side. The past hysteresis is displayed vertically. When an upper or lower button on the console (or the console panel) is depressed, a highlight of a character string that shows a selection of information moves.

When the user has selected a desired URL and a receiving time by looking at this display (the highlight of the character string showing a selection of information moves based on the operation of a predetermined selection key on the console panel 10. When this is stopped at a desired position, and a predetermined determination key is operated, a selection is carried out) (YES at step S24), the console panel controller 30 displays a message of a request for inputting a password on the LCD of the console panel 10 (at step S25).

When the user has input a password by operating the keys on the console panel 10 (YES at step S26), the user authenticator 29 collates the input password with the password stored in the set information 22, and decides whether the input password is correct or not (step S27).

An authentication unit is realized at step S27. When the input password is correct (YES at step S27), the processing shown in FIG. 4 is finished. When the input password is not correct (NO at step S27), the console panel controller 30 displays an error message on the LCD of the console panel 10 (step S28), and finishes the processing shown in FIG. 4. When the network printer 1 is equipped with a charge system, the user can use a user code in this charge system as a password to be input by the user.

Figure 5:
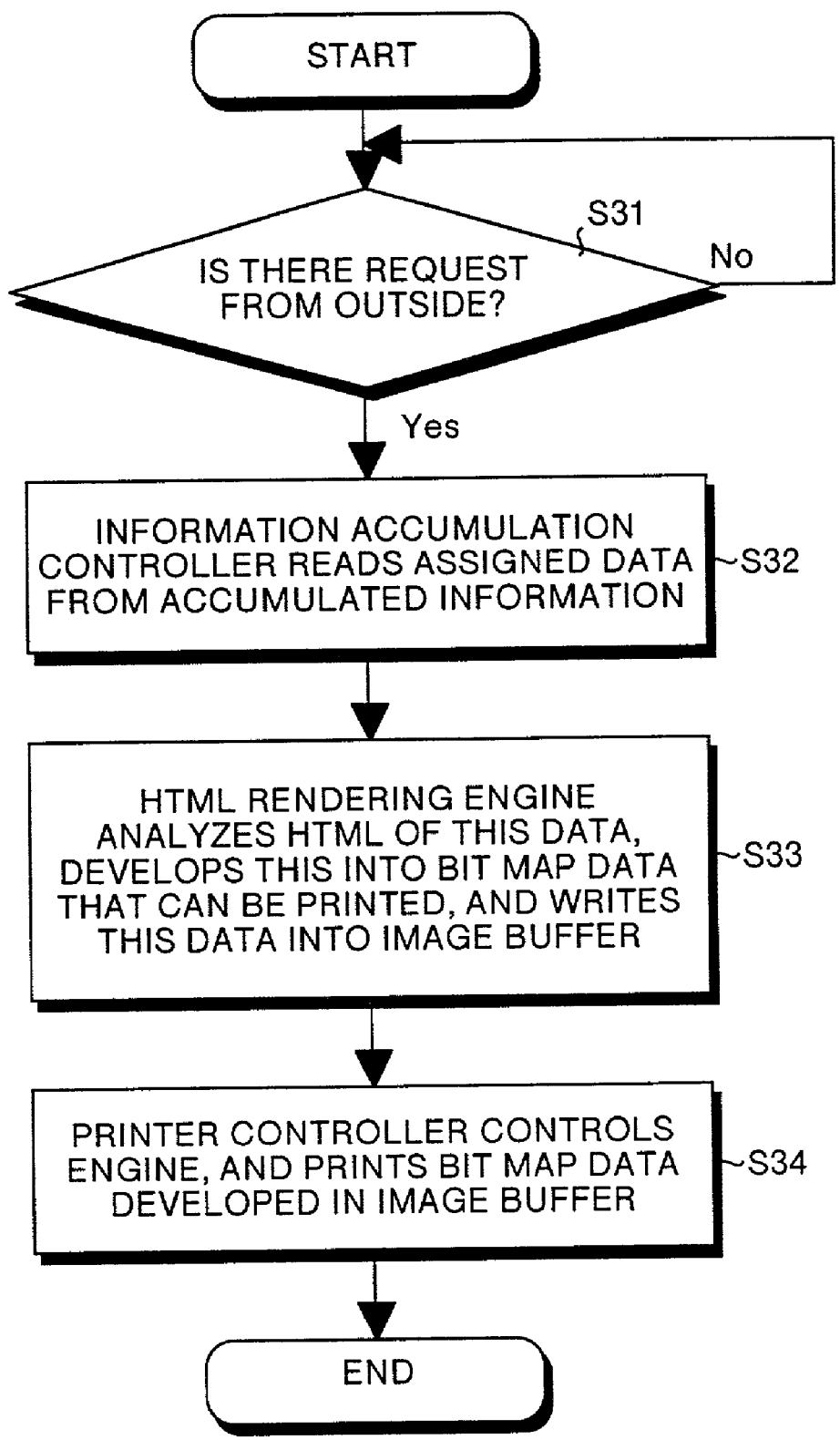
FIG. 5 is a flowchart for explaining a detailed processing procedure that the network printer carries out.

When there has been a print request from the outside (YES at step S31), the network printer 1 starts the print processing shown in FIG. 5. A receiving unit is realized at step S31. Specifically, when the processing has been finished as a result of a decision YES at step S27 in the processing of FIG. 4, a decision is made that there has been a print request from the outside.

The information accumulation controller 21 reads the data of which print has been requested from the outside, from the accumulated information 23 (step S32), and the HTML rendering engine 28 analyzes the HTML of this data, develops this into bit map data that can be printed with the printer engine 9, and writes this data into the image buffer 8 (step S33). Then, the printer controller 26 controls the printer engine 9, prints the bit map data developed in the image buffer 8 (step S34), and finishes the processing. A printing unit is realized at step S34.

According to the network printer 1 explained above, it is possible to collect information from the WWW site on the network 11, and print this, without utilizing a PC or a PDA.

Further, it is also possible to collect information automatically and periodically from a specific WWW site. Further, the user can make request for printing and carry out other various kinds of operations with the console panel 10 in front of the image formation apparatus 1.

Further, only when the password input by the user is correct (YES at step S27), the print processing shown in FIG. 5 is carried out. Therefore, it is possible to prevent an unspecified large number of users from printing and wasting paper resources.

The second embodiment of this invention will be explained now. In the second embodiment, portions of the network printer 1 that are common to those of the first embodiment will be attached with the same reference numbers as those of the first embodiment of the invention, and their detailed explanation will be omitted. A hardware structure of this network printer 1 is similar to that of the first embodiment of the invention explained with reference to FIG. 1.

FIG. 7 is a functional block diagram for explaining a processing that the network printer 1 executes according to a control program stored in a ROM 3. As shown in FIG. 7, a WWW server section 31 executes a function as the WWW server. A HTML generator 32 generates a requested list in the format of the HTML.

Figure 8:
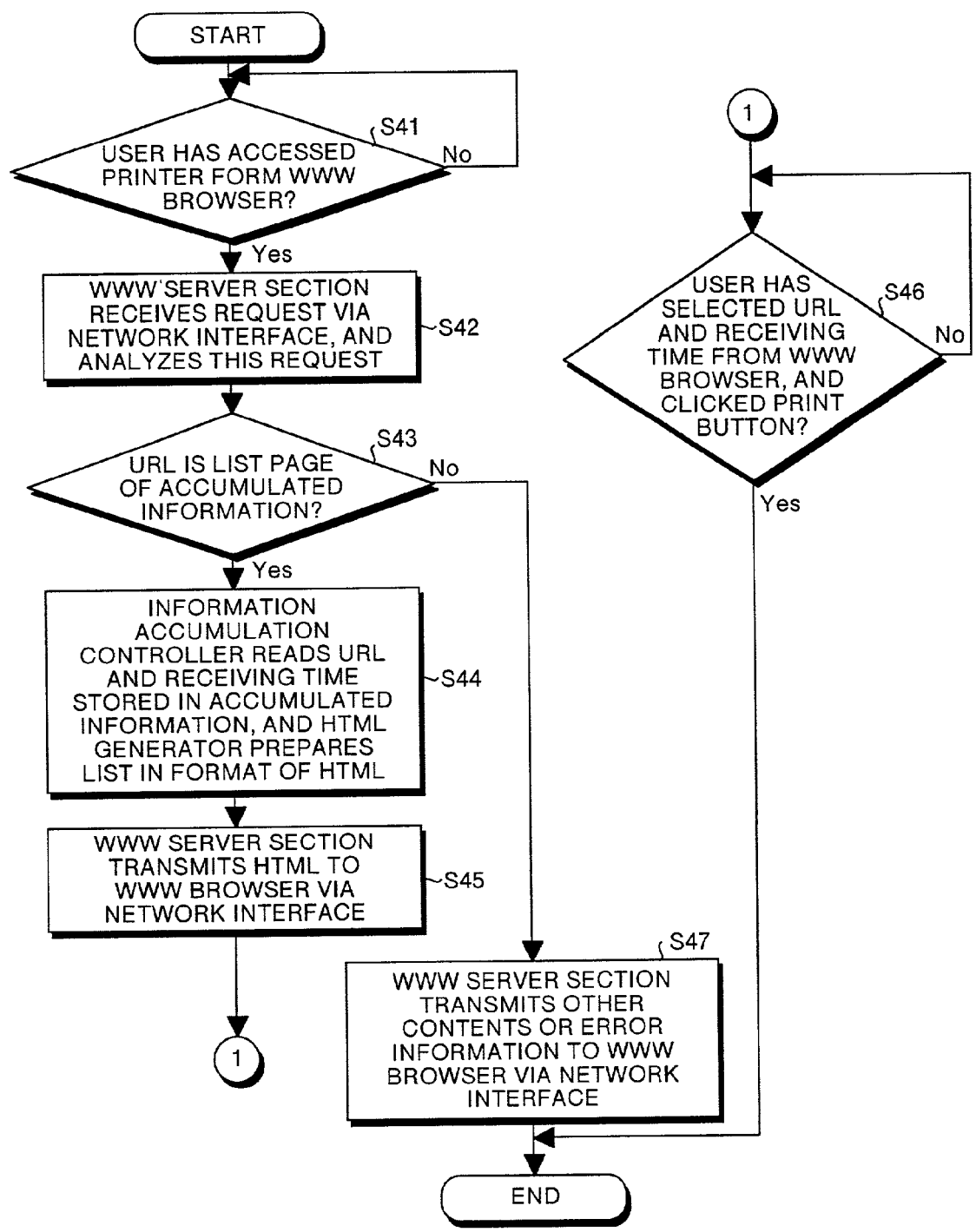
FIG. 8 is a flowchart for explaining a detailed procedure that the network printer carries out.

This network printer 1 executes the processing shown FIG. 3 and FIG. 5 in the same manner as in the first embodiment. However, instead of carrying out the processing shown in FIG. 4 the network printer 1 carries out the processing shown in FIG. 8. Namely, when the network printer 1 has been accessed from a WWW browser (a client) not shown that operates on a PC connected to the network printer 1 based on a LAN or the like (YES at step S41), the WWW server section 31 receives a request via the network interface 12, and analyzes this request (step S42).

When a URL assigned by the request is a list page of accumulated information 23 (YES at step S43), a HTML generator 32 reads a fetching-target URL and a receiving time stored in the accumulated information 23 (the information stored at step S8), and prepares this list in the format of the HTML (step S44). Then, the WWW server section 31 transmits the list in the format of the HTML to the WWW browser via the network interface 12 (step S45).

An example of a display of an image in the WWW browser of this list is as shown in FIG. 9. A user selects a desired URL and a receiving time on the screen of the example shown in FIG. 9, and clicks a print button 33. When the WWW server section 31 has confirmed this (YES at step S46), the processing is finished. When a decision has been made as YES at step S46, and the processing shown in FIG. 8 has been finished, the network printer 1 decides that there has been a print request from the outside (YES at step S31), and starts the print processing shown in FIG. 5.

When the URL assigned based on the request is not a list page of the accumulated information 23 at step S43 (NO at step S43), the WWW server section 31 transmits other contents or error information to the WWW browser via the network interface 12 (step S47). A receiving unit is realized at steps S44 to S46.

According to the network printer 1 explained above, a list of the URL and the receiving time is prepared in the format of the HTML (step S44), and this is transmitted to the WWW browser of the user (step S45), and the print request is received (step S46). Therefore, it is possible to make request for printing on a large display like that of a PC.

The third embodiment of this invention will be explained now. In the third embodiment, portions of the network printer 1 that are common to those of the first embodiment will be attached with the same reference numbers as those of the first embodiment of the invention, and their detailed explanation will be omitted. A hardware structure of this network printer 1 is similar to that of the first embodiment of the invention explained with reference to FIG. 1.

Figure 10:
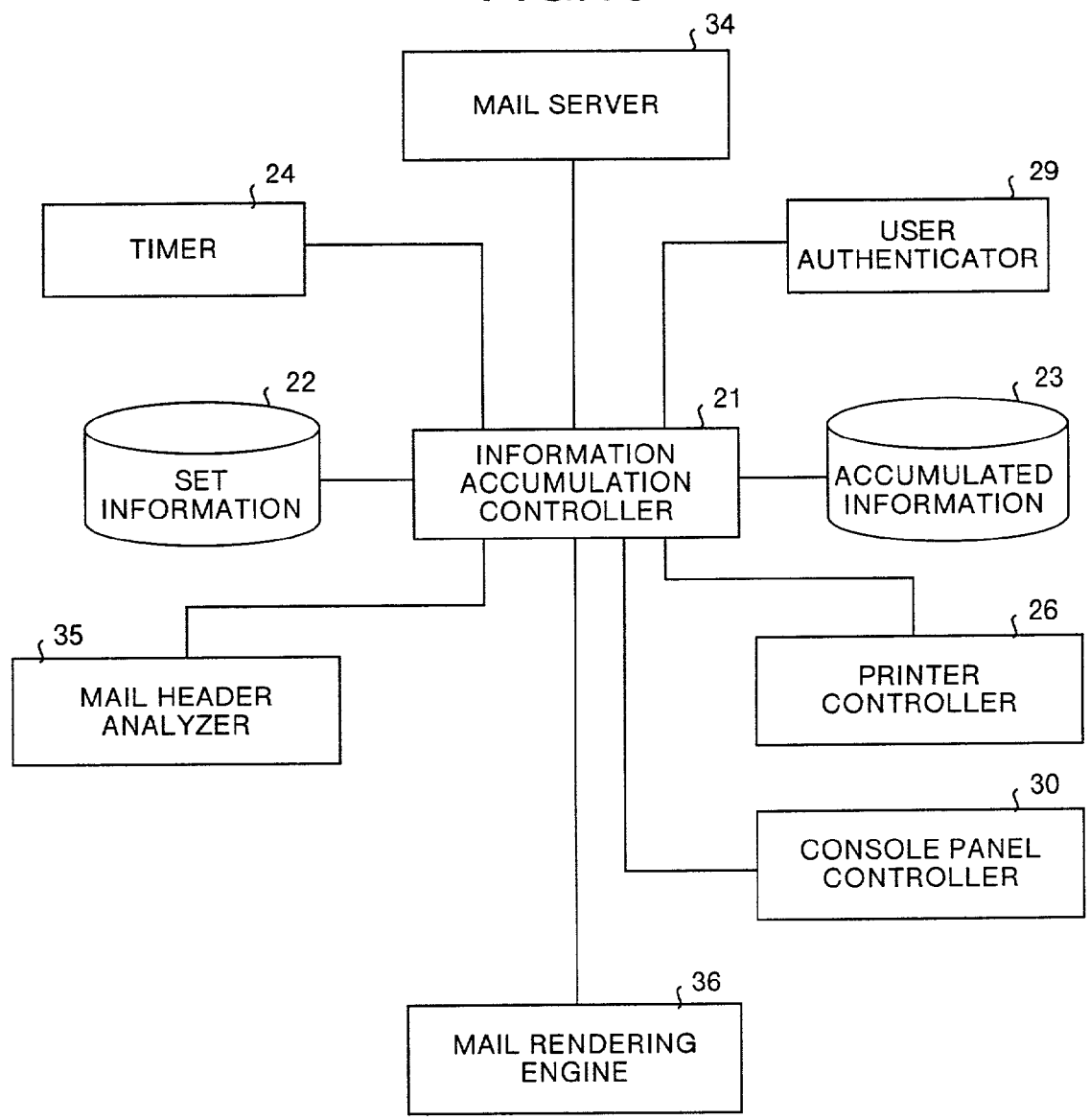
FIG. 10 is a functional block diagram for explaining a processing that the network printer executes according to a control program stored in a ROM according to a third embodiment of this invention.

FIG. 10 is a functional block diagram for explaining a processing that the network printer 1 executes according to a control program stored in a ROM 3. As accumulated information 23 of this network printer 1, there are stored data of an E-mail received via the network 11, an E-mail address of a sender, and a date and time when the E-mail is collected (accumulated).

A mail server 34 receives an E-mail via the network interface 12. A mail header analyzer 35 analyzes the header of a received E-mail, and extracts a mail address of a sender. A mail rendering engine 36 analyzes the E-mail, and develops the E-mail into bit map data that can be printed with the printer engine 9.

Figure 11:
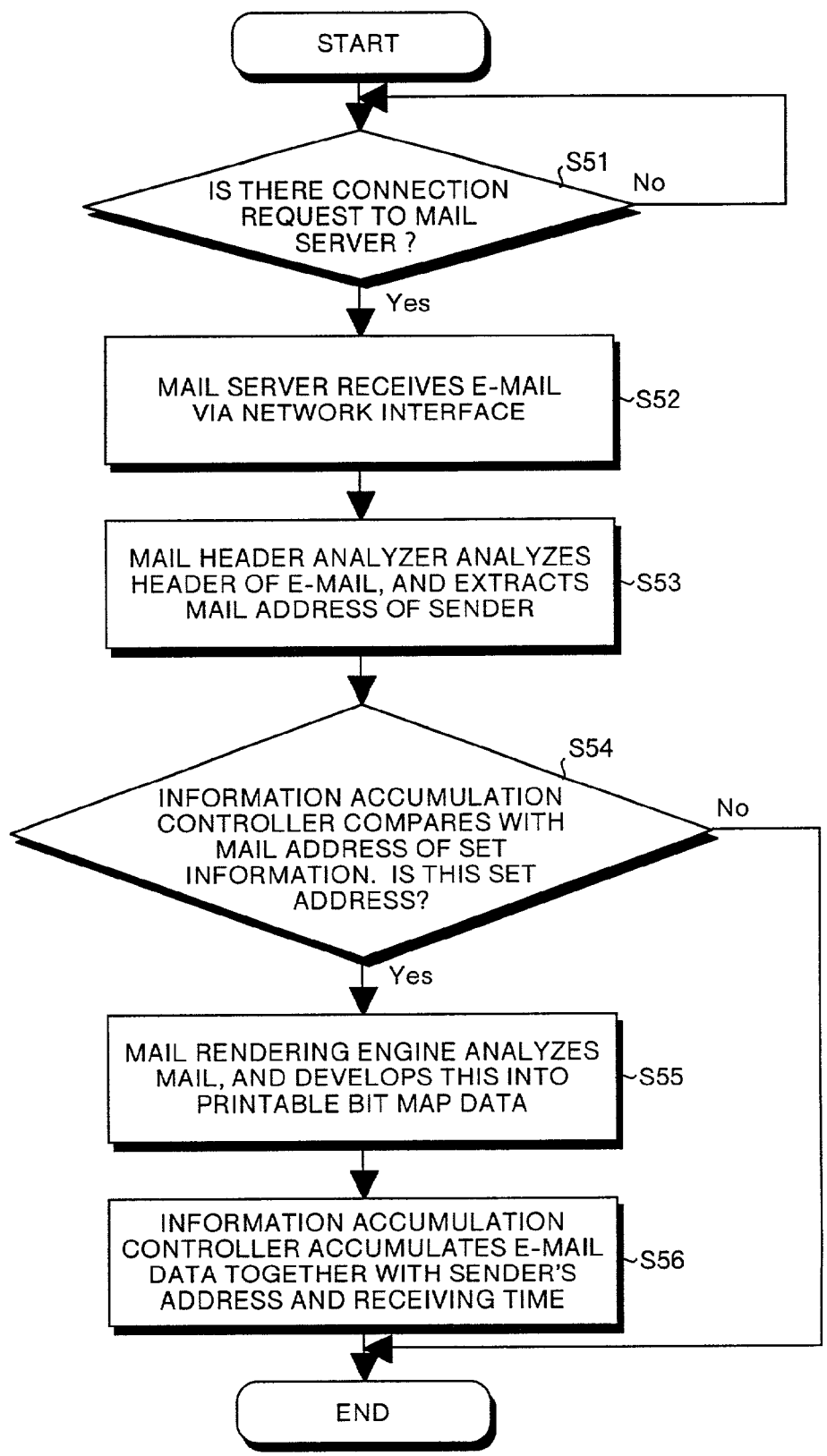
FIG. 11 is a flowchart for explaining a detailed processing procedure that the network printer carries out.

Next, the processes carried out by the network printer 1 will be explained with reference to FIG. 11 to FIG. 13. First, when there has been a request for connecting to the mail server 34 (YES at step S51), the processing shown in FIG. 11 is started. Namely, the network printer 1 receives an E-mail from an optional sender via the network interface 12 (step S52), analyzes the header of the E-mail received by the mail header analyzer 35, and extracts a mail address of the sender (step S53).

In this case, there is a risk of receiving a damage like a SPAM mail. Therefore, an E-mail address of a sender from whom an E-mail is to be received is stored as set information 22 in advance in the flash memories 5. The network printer 1 compares the mail address stored in the set information 22 with the mail address of the received E-mail (step S54). When the mail address stored in the set information 22 and the mail address of the received E-mail do not coincide with each other (NO at step S54), the processing shown in FIG. 11 is finished.

When the mail address stored in the set information 22 and the mail address of the received E-mail coincide with each other (YES at step S54), the mail rendering engine 36 analyzes the E-mail, and develops the E-mail into bit map data that can be printed with the printer engine 9 (step S55).

In this case, for the E-mail of a MIME multi-part, it is possible to analyze the multi-part. For the image data of an attached GIF and JPEG, it is possible to convert this data into bit map. Then, an information accumulation controller 21 accumulates E-mail data together with the address of the sender and the receiving time, as the accumulated information 23 (step S56). A data conversion unit is realized at step S56.

Figure 12:
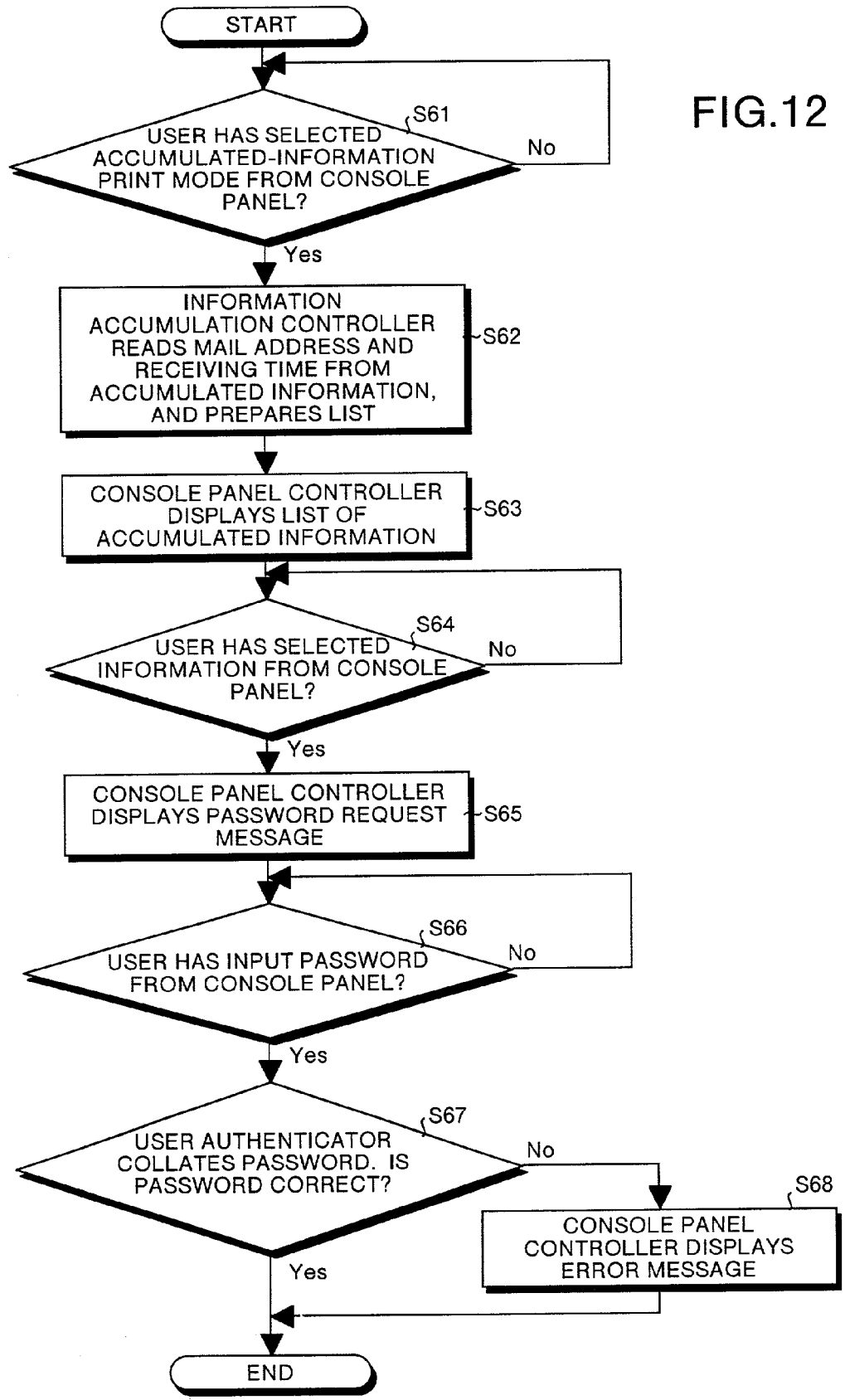
FIG. 12 is a flowchart for explaining a detailed processing procedure that the network printer carries out.

Next, as shown in FIG. 12, when the user has selected an accumulated information printing mode by operating the console panel 10 (YES at step S61), the network printer 1 starts the processing shown in a flowchart in FIG. 12. Namely, the information accumulation controller 21 reads the mail address of the sender and the receiving time stored in the accumulated information 23 (the information stored at step S56), and prepares a list of this information (step S62) Then, a console panel controller 30 displays this list on the LCD of the console panel 10 (step S63).

Figures 13, 14:
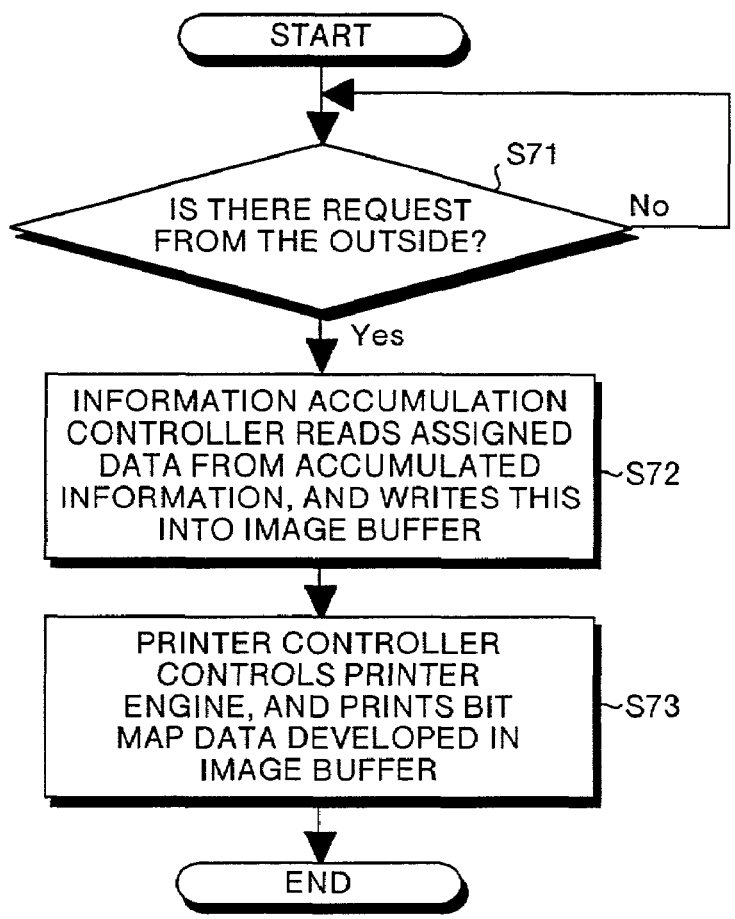
FIG. 13 is a flowchart for explaining a detailed processing procedure that the network printer carries out.
FIG. 14 is a top plan view showing one example of a screen display on a console panel of the network printer.

FIG. 14 shows one example of this image display. In the example of FIG. 14, an E-mail address is shown on the left side, and a receiving time is shown on the right side. The past hysteresis is displayed vertically. When an upper or lower button on the console (or the console panel) is depressed, a highlight of a character string that shows a selection of information moves.

When the user has selected a desired E-mail address and a receiving time by looking at this display (the highlight of the character string showing a selection of information moves based on the operation of a predetermined selection key on the console panel 10. When this is stopped at a desired position, and a predetermined determination key is operated, a selection is carried out) (YES at step S64), the console panel controller 30 displays a message of a request for inputting a password on the LCD of the console panel 10 (at step S65).

When the user has input a password by operating the keys on the console panel 10 (YES at step S66), the user authenticator 29 collates the input password with the password stored in the set information 22, and decides whether the input password is correct or not (step S67). An authentication unit is realized at step S67.

When the input password is correct (YES at step S67), the processing shown in FIG. 12 is finished. When the input password is not correct (NO at step S67), the console panel controller 30 displays an error message on the LCD of the console panel 10 (step S68), and finishes the processing shown in FIG. 12. When the network printer 1 is equipped with a charge system, the user can use a user code in this charge system as a password to be input by the user.

When there has been a print request from the outside (YES at step S71), the network printer 1 starts the print processing shown in FIG. 13. A receiving unit is realized at step S71. Specifically, when the processing has been finished as a result of a decision YES at step S67 in the processing of FIG. 12, a decision is made that there has been a print request from the outside.

The information accumulation controller 21 reads the data of which print has been requested from the outside, from the accumulated information 23, and writes this data into the image buffer 8 (step S72). Then, the printer controller 26 controls the printer engine 9, prints the bit map data written in the image buffer 8 (step S73), and finishes the processing. A printing unit is realized at step S73.

In this example, the network printer 1 itself has the mail server function, and becomes the mail host. However, it is also possible to arrange such that a separate workstation connected to a network like a LAN is used as a mail host, the mail host operates the server of a POP or an IMAP4, and the network printer 1 has these client functions. Therefore, according to the network printer 1, it is possible to collect E-mail information and print this, without utilizing a PC or a PDA.

Further, only when the password input by the user is correct (YES at step S67), the print processing shown in FIG. 13 is carried out. Therefore, it is possible to control the distribution of E-mail news such that that only contracted users can read charged E-mail news of which disclosure to an unspecified large number of users has been prohibited. Further, as it is possible to convert the E-mail information into bit map data before storing the information as the accumulated information 23 (step S55), it is possible to shorten the time for waiting for the printing.

In the above first to third embodiments, there has been explained a case where the present invention is applied to a composite device that can be utilized as a printer, a copying machine or a facsimile unit. In the mean time, there have recently been devised image formation apparatuses that are used as a platform of software by using common portions of software (applications) corresponding to a printer, a copying machine, and a facsimile unit. For example, Japanese Patent Application No. 2000-204235 and Japanese Patent Application No. 2000-204257 describe these image formation apparatuses. The fourth embodiment of this invention assumes a case where the present invention is applied to a composite device having a platform that uses common portions of applications.

Figure 15:
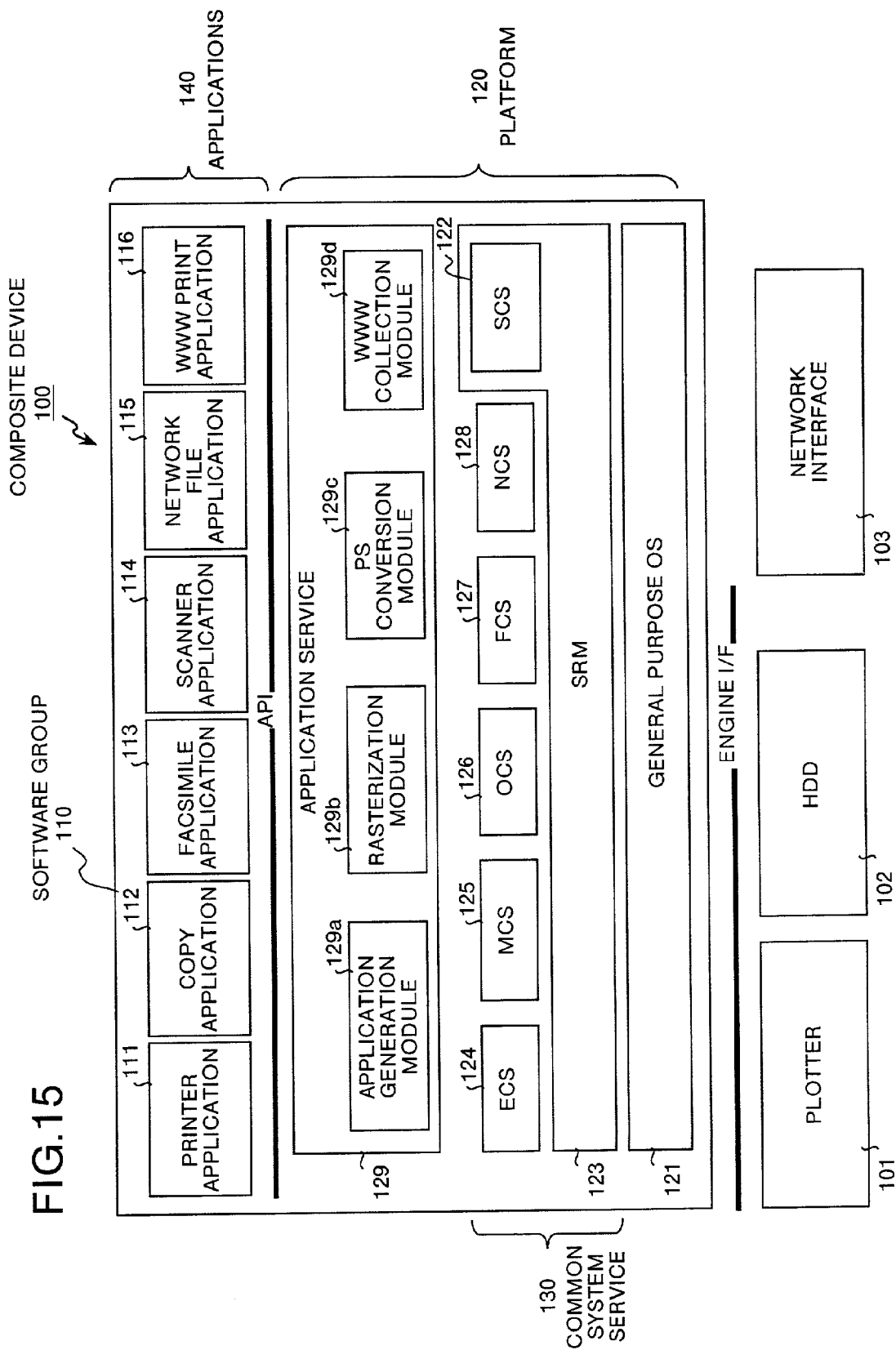
FIG. 15 is a functional block diagram showing a structure of a composite device relating to a fourth embodiment.

First, a structure of a composite device relating to the fourth embodiment will be explained. FIG. 15 is a functional block diagram showing a structure of the composite device relating to the fourth embodiment. As shown in this drawing, this composite device 100 consists of a plotter 101, a hard disk unit (HDD) 102, and a network interface 103. A software group 110 consists of a platform 120, and applications 140.

The platform 120 consists of a general-purpose OS 121, a common system service 130, and an application service 129. The general-purpose OS 121 is a general-purpose operating system like the UNIX, and executes each software of the platform 120 and the applications 140 in parallel as respective processes. Based on the use of the open-source UNIX, it is possible to secure safety of computer programs, and it is possible to correspond to a network. It also becomes possible to obtain a source code. Further, royalties of the OS and the TCP/IP are not necessary, and outsourcing becomes easy.

The common system service 130 provides basic common services to the applications 140, and consists of an SRM (System Resource Manager) 123 having an SCS (System Control Service) 122, an ECS (Engine Control Service) 124, an MCS (Memory Control Service) 125, an OCS (Operation panel Control Service) 126, an FCS (FAX Control Service) 127, and an NCS (Network Control Service) 128.

The SRM 123 controls the system and manages the resources together with the SCS 122. The SRM 123 carries out arbitration and control of execution according to a request from a higher layer that utilizes the hardware resources like the engine of the plotter 101 and a scanner, a memory, the HDD 102, and host I/Os (a centro I/F, the network interface 103, an IEEE1394I/F, and an RS232CI/F).

Specifically, the SRM 123 makes a decision about whether it is possible to utilize a requested hardware resource or not (whether the hardware resource is not being utilized based on other request or not). When it is possible utilize the requested hardware resource, the SRM 123 posts to the higher layer that it is possible to utilize the requested hardware resource. Further, it is also possible to arrange such that the SRM 123 schedules the utilization of a hardware resource according to a request from the higher layer, and directly executes the requested contents (for example, carrying of paper based on the printer engine, image formation operation, securing a memory, and file preparation).

The SCS 122 carries out (1) application management, (2) control of the console, (3) display of a system screen (such as job (task) list screen, and a counter display screen), (4) display of an LED, (5) resource management, and (6) interruption application control. Specifically, in the (1) application management, the SCS 122 carries out registration of an application, and posting of this information to other application. The SCS 122 posts an engine status to a registered application according to a setting of the system and a setting of a request from the application. Further, the SCS 122 inquires a registered application into a shifting of a power mode, an interruption mode, and a shifting of a system status.

Further, in the (2) control of the console, the SCS 122 carries out an exclusive control of the right of an application for the use of the console. Then, the SCS 122 exclusively posts key information from the console driver (OCS) to an application that has the right of using the console. This key information is for executing a mask control for temporarily stopping the posting according to a shift of a system status like a status that the application is being switched.

Further, in the (3) display of a system screen, the SCS 122 displays an alarm screen corresponding to an engine status according to the contents of a request from an application that has the right of using the console. Among the displays, there is an ON/OFF display of an alarm according to a status of an application like a user limit screen. Other than the engine status, the SCS 122 controls the display of a job list screen for displaying a status of job reservation/execution, a counter screen for displaying a total counter, and a display for showing that the CSS is in the communication status. Regarding these system screen displays, the SCS 122 does not request an application for a release of the right of using the console, and draws an image as a system screen that covers an application screen.

Further, in the (4) display of an LED, the SCS 122 carries out a display control of an alarm LED, and a system LED like application keys. Regarding an LED that is own to an application, the application directly controls the display by using a display driver.

Further, in the (5) resource management, the SCS 122 provides services for an exclusive control of the engine resource (for the scanner and the staple) to be exclusively controlled for the application (ECS) to execute a job. In the (6) interruption application control, the SCS 122 provides control/services for a specific application to carry out operation with priority.

The ECS 124 controls the plotter 101, the HDD 102, and the network interface 103. The ECS 124 carries out image reading, print operation, status posting, and recovery from a jam.

Specifically, the ECS 124 sequentially issues print requests to the SRM 123 according to assignment of job modes received from the applications 140, thereby to realize a series of copy/scan/print operations. As a job to be handled by the ECS 124, an image input device is to be assigned with a SCANNER, or an image output device is to be assigned with a PLOTTER.

For example, when performing a copy operation, "SCANNER-PLOTTER" is specified. When performing file accumulation, "SCANNER-MEMORY" is specified. When transmitting a facsimile, "SCANNER-FAX_IN" is specified. When printing an accumulated file, or when printing using a printer application 111, "MEMORY-PLOTTER" is assigned. When receiving a facsimile, "FAX_OUT-PLOTTER" is specified.

A definition of a job is different depending on an application. In this case, the operation of processing one set of image group that the user handles is defined as one job. For example, in the case of a copy ADF (Automatic Document Feeder) mode, the operation of reading one set of document placed on a draft table becomes one job. In the case of a compressed plate mode, the read operation until a final draft has been firmed up becomes one job. In the case of a copy application 112, the operation of copying a bundle of draft becomes one job. In the case of a facsimile application 113, the transmission operation of one document or the reception operation of one document becomes one job. In the case of a printer application, the print operation of one document becomes one job.

The MCS 125 carries out memory control. Specifically, the MCS 125 carries out obtaining and release of an image memory, utilization of the hard disk unit (HDD), and compression and expansion of image data.

As functions that are necessary for managing information necessary as an image data file to be accumulated in the hard disk unit, there are (1) a file access (generate/delete/open/close) function (including an exclusive processing), (2) various file attribute management (management as a file of image data in a physical page unit) such as file name/ID management (file/user)/password management/accumulation time management/number of pages/data format (a compression system or the like)/access limit/preparation application/print condition management, (3) a combine/insert/disconnect function in a file unit or a page unit, (4) a file sort function (in the order of accumulation time/in the order of user IDs, etc.), (5) posting of all file information (for display/detection), (6) a recovery function (file/page abandon of a damaged file), and (7) an automatic file delete function.

Further, as functions for holding image data in a memory like a RAM, and making access, there are (1) a function of obtaining a file and page/band attribute information from the applications 140, and (2) a function of securing, releasing, reading and writing an image data area from the applications 140.

The OCS 126 is a module for controlling the console panel that becomes means for transmitting information between the operator and the main body control. The OCS 126 carries out a processing of posting a key console event of the operator to the main body control, a processing of providing a library function for each application to build up a GUI, a processing of managing the built-up GUI information by application, and a processing of reflecting a display to the console panel.

This OCS 126 has (1) a function of providing a library for building up a GUI, (2) a function of managing a console hardware resource, (3) a VRAM drawing/LCD display function (a hardware display, a display application change-over, a display language change-over, a window dark-color display, a message/icon blink display, and a message linkage display), (4) a hard key input detection function, (5) a touch panel key input detection function, (6) an LED output function, and (7) a buzzer output function.

The FCS 127 provides an API for carrying out a transmission/reception of facsimile using a PSTN/ISDN network form each application layer of the system controller, registration/citing of various kinds of facsimile data that are managed by a BKM (back-up SRAM), reading of facsimile, reception and printing of facsimile, and fused transmission and reception.

Specifically, this FCS 127 has (1) a transmission function for transmitting documents of which transmission has been requested by the application layer, to a facsimile receiver by using the PSTN/ISDN network, (2) a receiving function for transferring facsimile reception screens and various kinds of reports that have been received from the PSTN/ISDN network, and printing them, (3) a telephone directory citing/registering function for citing and registering telephone directories and facsimile management items like group information that are stored in the facsimile board, (4) a facsimile log posting function for posting transmission/reception result hysteresis information stored in the BKM mounted on the facsimile board, to an application that requires this information, and (5) an event posting function for posting an event of a change in the application registered in the FCS when there has been a change in the status of the facsimile board.

The NCS 128 is a module group for providing services that can be commonly used, to an application that requires a network I/O. The NCS 128 allocates data received by each protocol from the network side to each application, and intermediates the transmission of the data from the application to the network. Specifically, the NCS 128 has server demons like ftpd, httpd, lpd, snmpd, telnetd, and smtpd, and a client function of the same protocol.

The application service 129 is one of common services that form the plat form 120. The application service 129 provides services at the applications 140 side, unlike the ECS 124, the MCS 125, the OCS 126, the FCS 127, the NCS 128, the SRM 123, and the SCS 122 that form the common system service 130.

In other words, this application service 129 exists between the applications 140 and the common system service 130, and plays a role of a bridge between the both.

Specifically, this application service 129 has a job generation module 129*a* that collectively carries out the functions of a job generation and data communications that the copy application 112, the facsimile application 113, and a scanner application 114 basically carry out, on their behalf. Therefore, the copy application 112, the facsimile application 113, and the scanner application 114 may work only for the screen and key operations as a main. As a result, the application development efficiency improves.

Further, the application service 129 has a rasterization module 129*b*, a PS conversion module 129*c*, and a WWW collection module 129*d*. These modules exist between the common system service 130 and the applications 140, and play a role of a bridge between the both.

The rasterization module 129*b* is a module for rasterizing data described in the postscript as a page description language, and converting the data into bit map data. The PS conversion module 129*c* is a module for converting data collected via the network, into data of the postscript.

The WWW collection module 129*d* is a module for collecting WWW data via the WWW of the Internet. Specifically, the WWW collection module 129*d* collects data from the WWW site according to the fetching-target information that shows a destination of obtaining information held on the memory or the HDD 102, and an obtaining timing. Specifically, the URL at the WWW site corresponds to collected fetching-target information. It is also possible to obtain an E-mail as the information.

The applications 140 include a printer application 111 as an application for the printer, a copy application 112 as an application for a copy machine, a facsimile application 113 as an application for a facsimile unit, a scanner application 114 as an application for a scanner, a network file application 115 as an application for a network, and a WWW print application 116 as an application for printing WWW data. In addition to these, it is also possible to provide a process inspection application as an application for inspecting the process.

This WWW print application 116 is an application that is utilized when the WWW data is printed. In response to an instruction from the WWW print application 116, the WWW collection module 129*d* collects information.

Specifically, when the URL of the fetching-target information and an information obtaining timing have been assigned from the WWW print application 116, the WWW collection module 129*d* obtains the WWW data from this position at the assigned time. When it has been instructed from this WWW print application 116 to immediately obtain the WWW data from a specific URL, the WWW collection module 129d obtains the WWW data immediately.

Each of the applications 111 to 116 is effected to execute each operation by utilizing each process on the platform 120. Therefore, the screen display control becomes the main body. Particularly, as the application service 129 is provided on the platform 120, it is not necessary to generate a job or provide a function for data communications.

Figure 16:
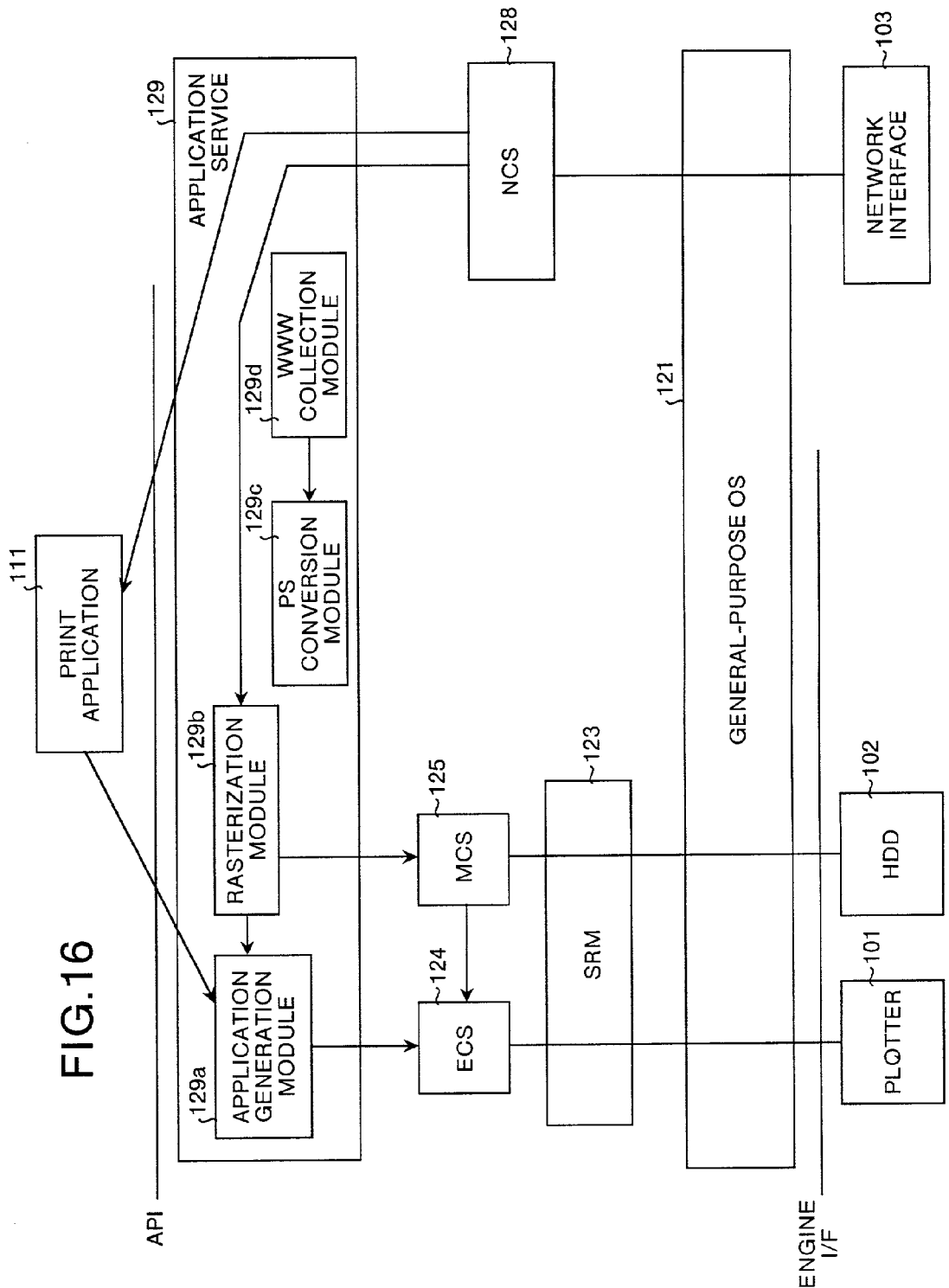
FIG. 16 is a diagram for explaining the operation of printing data by using a print application shown in FIG. 15.

Next, a process of printing data by using the composite device 100 shown in FIG. 15 will be explained. FIG. 16 is a diagram for explaining the operation of printing data by using the print application 111 shown in FIG. 15. For the sake of convenience of the explanation, only the SRM 123, the ECS 124, the MCS 125, and the NCS 128 are shown as the common system service 130.

As shown in FIG. 16, when the NCS 128 of the composite device 100 has received print data from the network interface 103, the arrival of the print data is posted to the print application 111. The print application 111 instructs the application generation module 129a to generate a job. When this NCS 128 has output the print data to the rasterization module 129b, the rasterization module 129b rasterizes to convert the print data into bit map data, and outputs the bit map data to the MCS 125.

The MCS 125 stores this bit map data into the memory or the HDD 102. At the same time, when a data request has been received from the ECS 124, the MCS 125 outputs this bit map data to the ECS 124. Then, the ECS 124 outputs the bit map data to the plotter 101 to make it print this data.

As explained above, when the print data received via the network is to be printed, the print data is developed into bit map data by using the rasterization module 129b provided on the platform 120. In this case, the PS conversion module 129c and the WWW collection module 129d are not utilized.

Figure 17:
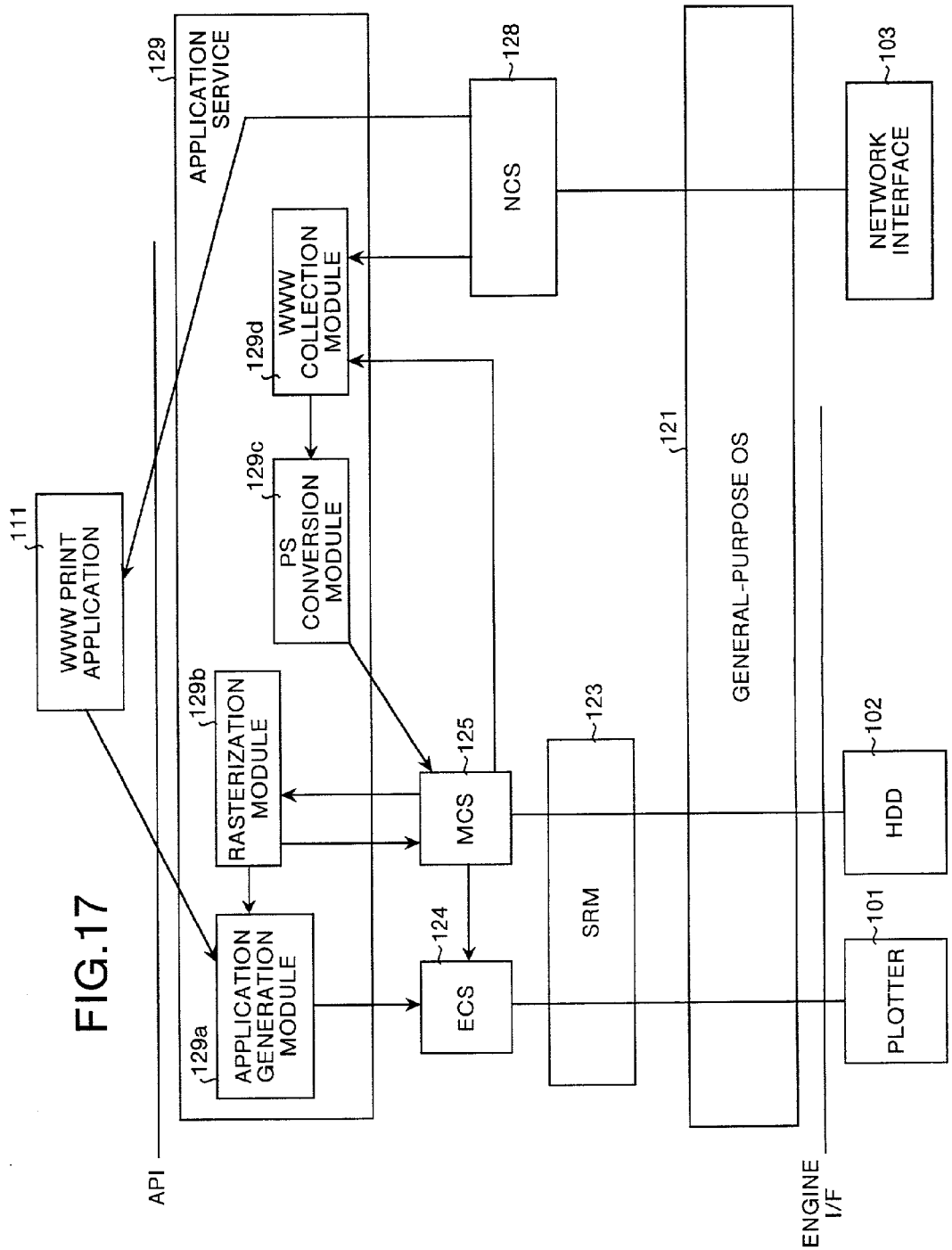
FIG. 17 is a diagram for explaining the print operation of WWW data using a WWW print application shown in FIG. 15.

Next, the print operation of the WWW data using the WWW print application 116 shown in FIG. 15 will be explained. FIG. 17 is a diagram for explaining the print operation of the WWW data using the WWW print application 116 shown in FIG. 15. For the sake of convenience of the explanation, only the SRM 123, the ECS 124, the MCS 125, and the NCS 128 are shown as the common system service 130.

The WWW print application 116 assigns a destination (URL) of obtaining the WWW data and the obtaining time, and as shown in FIG. 17, when the fetching-target (URL) and the obtaining time are stored in the memory or the HDD 102, the WWW collection module 129d receives the fetching-target (URL) and the obtaining time from the MCS 125, and collects the WWW data from the WWW server of the URL corresponding to the obtaining time.

When the NCS 128 has received the WWW data, the NCS 128 posts this effect to the WWW print application 111. The WWW print application 111 generates a job. The WWW collection module 129d that has received the WWW data from the NCS 128 outputs this WWW data to the PS conversion module 129c. This PS conversion module 129c converts the WWW data into the postscript data, and outputs the result to the MCS 125.

The MCS 125 converts the WWW data into bit map data by using the rasterization module 129b, and stores this bit map data into the memory or the HDD 102. When requested from the ECS 124, the MCS 125 outputs this bit map data to the ECS 124. Then, the ECS 124 prints this bit map data with the plotter 101.

For the sake of convenience of the explanation, the bit map data has been stored into the memory or the HDD 102. However, it is also possible to arrange such that the WWW data of the postscript is stored into the memory or the HDD 102, and that the WWW data is converted into the bit map data when this has been requested from the ECS 124.

As explained above, based on the use of the WWW collection module 129d, the PS conversion module 129c, and the rasterization module 129b on the platform 120, it is possible to collect the WWW data from the network and print this data.

As described above, according to the fourth embodiment, the application generation module 129a, the rasterization module 129b, the PS conversion module 129c, and the WWW collection module 129d are provided within the application service 129 that exists between the common system service 130 and the applications 140. Therefore, it is possible to collect the WWW data from the network, and print this data.

In the above fourth embodiment, there has been explained a case where the application service 129 is provided between the common system service 130 and the applications 140. However, the present invention is not limited to this. It is also possible to apply the present invention to a case where the application service 129 is not provided. The fifth embodiment assumes a case where the applications 140 carry out the processing of the above application service 129.

Figure 18:
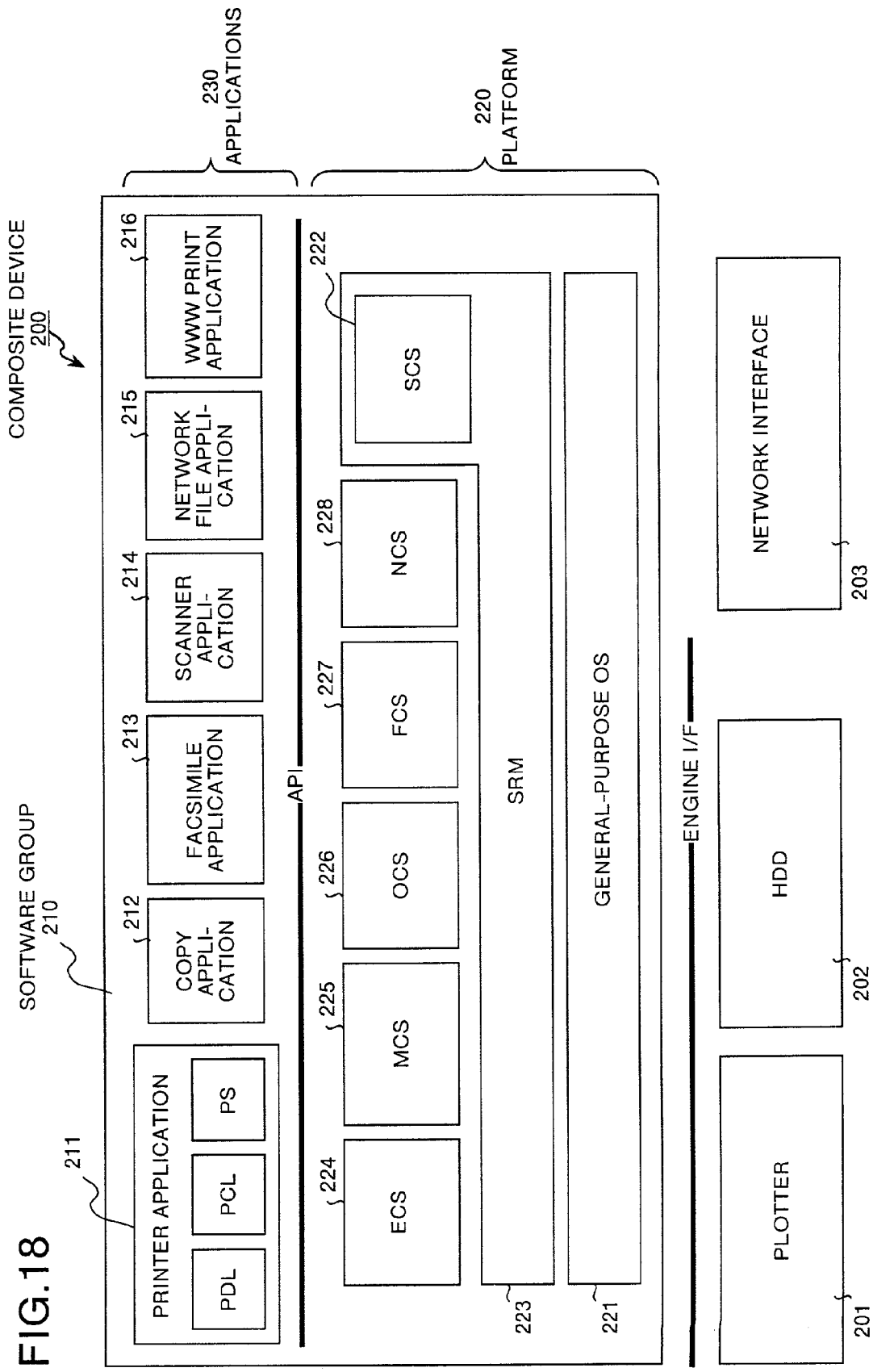
FIG. 18 is a functional block diagram showing a structure of a composite device relating to a fifth embodiment.

First, a structure of a composite device relating to the fifth embodiment will be explained. FIG. 18 is a functional block diagram showing a structure of the composite device relating to the fifth embodiment. As shown in this drawing, this composite device 200 consists of a plotter 201, a hard disk unit (HDD) 202, and a network interface 203. A software group 210 consists of a platform 220, and applications 240.

The platform 220 consists of a general-purpose OS 221, an SRM (System Resource Manager) 223 having an SCS (System Control Service) 222, an ECS (Engine Control Service) 224, an MCS (Memory Control Service) 225, an OCS (Operation panel Control Service) 226, an FCS (FAX Control Service) 227, and an NCS (Network Control Service) 228. These portions are similar to those shown in FIG. 15, and therefore, their detailed explanation will be omitted.

The applications 230 include a printer application 211 as an application for the printer, a copy application 212 as an application for a copy machine, a facsimile application 213 as an application for a facsimile unit, a scanner application 214 as an application for a scanner, a network file application 215 as an application for a network, and a WWW print application 216 as an application for collecting and printing WWW data. In addition to these, it is also possible to provide a process inspection application as an application for inspecting the process.

The WWW print application 216 is an application for obtaining the WWW data from the WWW server and printing this WWW data. Specifically, when the URL of the WWW server of the fetching-target information and the information obtaining timing are assigned, the WWW print application 216 obtains the WWW data from the WWW server, converts this data into rasterize data, and requests for the printing of this data.

Figure 19:
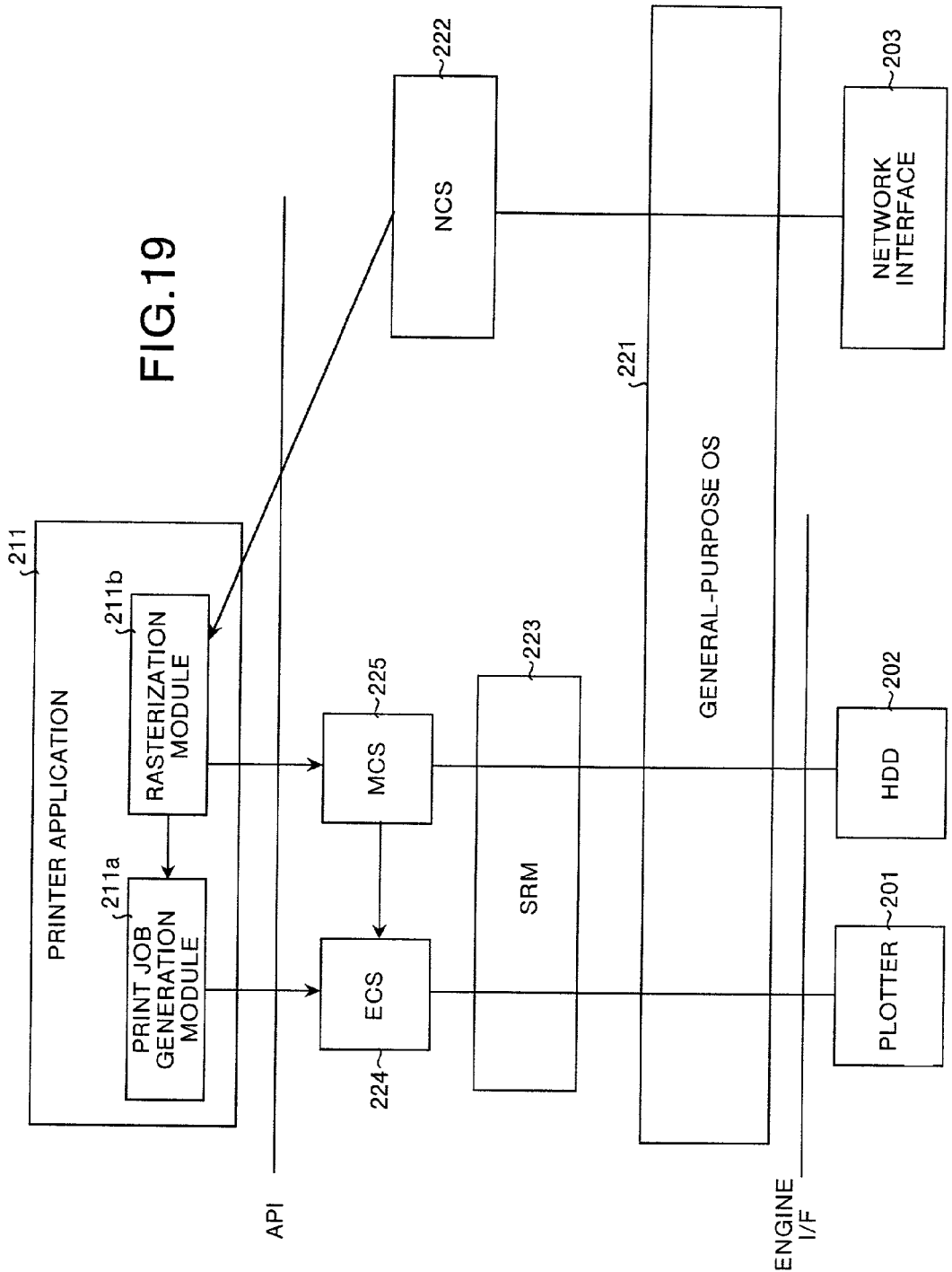
FIG. 19 is a diagram for explaining the print operation of print data using the composite device shown in FIG. 18.

Next, how the composite device 200 shown in FIG. 18 prints data will be explained. FIG. 19 is a diagram for explaining the operation of the composite device 200.

When the NCS 222 has received print data via the network interface 203, the NCS 222 transmits the print data to the printer application 211. Then, the printer application 211 rasterizes the print data, and stores the print data into the memory or the HDD 202 via the MCS 225.

When the printer application 211 has generated a print job and requested the ECS 224 to execute the job, the ECS 224 receives the print data from the MCS 225, and prints the print data with the plotter 201.

As explained above, based on the provision of a rasterization module 211b within the printer application 211, it is possible to rasterize the print data received from the network, and print this data. However, this has a drawback in that it is necessary to provide a rasterizer of a relatively heavy processing separately for each application.

Figure 20:
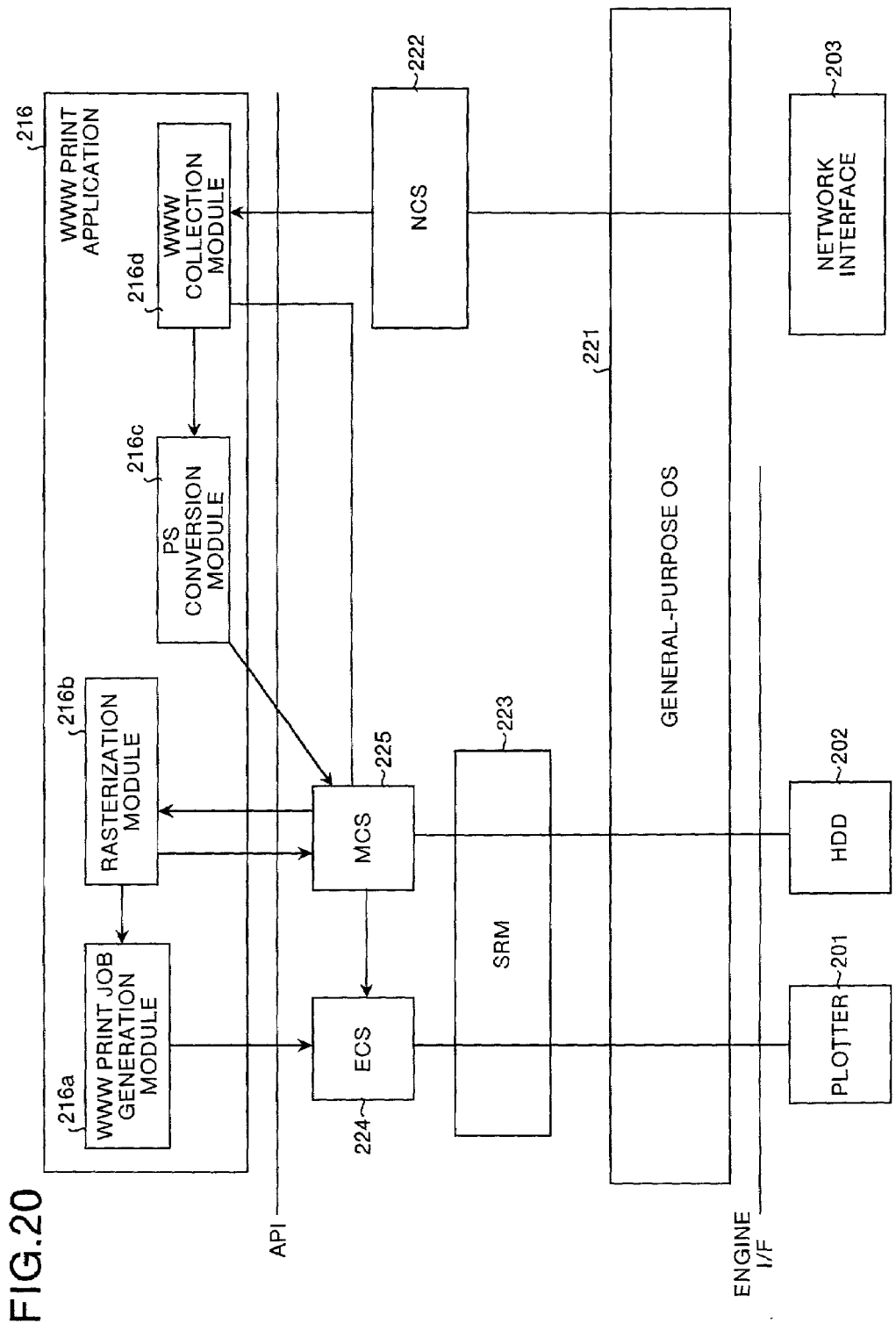
FIG. 20 is a diagram for explaining the operation of obtaining and printing WWW data using WWW print application shown in FIG. 18.

Next, the operation of obtaining and printing the WWW data using the WWW print application 216 shown in FIG. 18 will be explained in further detail. FIG. 20 is a diagram for explaining the operation of obtaining and printing the WWW data using the WWW print application 216 shown in FIG. 18.

As shown in FIG. 20, this WWW print application 216 has a WWW print job generation module 216a, a rasterization module 216b, a PS conversion module 216c, and a WWW collection module 216d.

The WWW print application 216 assigns a fetching-target (URL) and a time for obtaining the WWW data. When the fetching-target (URL) and the obtaining time have been stored in the memory or the HDD 202, the WWW collection module 216d receives the fetching-target (URL) and the obtaining time from the MCS 225, and collects the WWW data from the WWW server of the URL at the corresponding time.

When the NCS 222 has received the WWW data, the WWW data is output to the WWW collection module 216d. The PS conversion module 216c converts this WWW data into a postscript, and outputs this to the MCS 225.

The MCS 225 converts this WWW data into bit map data using the rasterization module 216b, and stores this bit map data into the memory or the HDD 202. In response to the posting from the rasterization module 216b, the WWW print job generation module 216a generates a WWW print job, and requests the ECS 224 to execute this job. When the MCS 225 has received a request from the ECS 224 to output the print data, the MCS 225 outputs this bit map data to the ECS 224. Then, the ECS 224 prints this bit map data with the plotter 201.

As explained above, based on the use of the WWW collection module 216d, the PS conversion module 216c, and the rasterization module 216b on the WWW print application 216, it is possible to collect the WWW data from the network and print this data.

As described above, according to the fifth embodiment, it has been constructed to use the WWW print application 216 that has the WWW collection module 216d, the PS conversion module 216c, and the rasterization module 216b. Therefore, it is possible to collect the WWW data from the network and print this data.

In the fifth embodiment, the WWW collection module 216d and the like are used as the elements of the WWW print application 216, unlike the fourth embodiment. Therefore, the fifth embodiment has an advantage in that it is not necessary to update the platform 220. However, there is a drawback in that a plurality of applications must have the rasterization module 216b or the like independently.

As explained above, information is obtained from the network via the network interface, and the information is stored in an information storage. When a request for printing has been received from the outside, the information stored in the information storage is printed with the printer engine. Therefore, there is an effect that it is possible to obtain an image formation apparatus that is capable of collecting information on the network and printing this information, without utilizing a PC or a PDA.

Furthermore, a fetching-target information as the information for specifying a destination of obtaining the information is stored in a first storage. Fetching-timing information that is the information for specifying a timing of periodically obtaining the information is stored in a second storage. The information is obtained from a destination indicated by the fetching-target information when the fetching-timing information is shown. Therefore, there is an effect that it is possible to obtain an image formation apparatus capable of collecting information automatically and periodically from a specific fetching-target.

Moreover, the destination of obtaining the information is a WWW server, and the fetching-target information is a URL at a WWW site. Therefore, there is an effect that it is possible to obtain an image formation apparatus capable of collecting information from a WWW site and printing this information, without utilizing a PC or a PDA.

Furthermore, the information is an E-mail. Therefore, there is an effect that it is possible to obtain an image formation apparatus capable of collecting E-mail information and printing this information, without utilizing a PC or a PDA.

Moreover, information obtained is converted into bit map data before storing the information into the information storage. Therefore, there is an effect that it is possible to obtain an image formation apparatus capable of shortening the time for waiting for the printing.

Furthermore, the request for printing is received by operating a console panel of the present apparatus. Therefore, there is an effect that it is possible to obtain an image formation apparatus capable of enabling a user to make request for printing and carry out other various kinds of operations in front of the image formation apparatus.

Moreover, the information storage stores information obtained from the network, together with the fetching-target information as the information for specifying a destination of obtaining this information and a time of receiving this information. A list of the information on the fetching-target information and the receiving time stored in the information storage is converted into the HTML format, and this converted list is transmitted to a WWW browser of a user via the network. The request for printing is received on a display screen of this transmitted data. Therefore, there is an effect that it is possible to obtain an image formation apparatus capable of making request for printing on a large display like that of a PC.

Furthermore, a printing from a specific user is refused. Therefore, there is an effect that it is possible to prevent an unspecified large number of users from printing and wasting paper resources. Further, there is an effect that it is possible to obtain an image formation apparatus capable of controlling the distribution of E-mail news such that that only contracted users can read charged E-mail news of which disclosure to an unspecified large number of users has been prohibited.

The computer program according to the present invention contains instructions which when executed on a computer realizes the method according to the present invention on the computer. Therefore, there is an effect that it is possible to realize the method according to the present invention easily and automatically.

According to still another aspect of the present invention, the platform of the image formation apparatus comprises: an information obtaining module which obtains information from the network via the network interface; a memory control module which stores the information obtained by the information obtaining module into the storage section; and an engine control module which prints, using the printing section, the information stored in the storage section that has been requested for printing, when the information printing request has been received from the network. Therefore, there is an effect that it is possible to obtain an image formation apparatus capable of executing the processing like the obtaining of information, in common to each application.

Furthermore, the storage section stores the fetching-target information that is the information for specifying a destination of obtaining the information, and the fetching-timing information that is the information for specifying a timing of periodically obtaining the information, and the information obtaining module obtains the information from a destination indicated by the fetching-target information when the fetching-timing information stored in the storage section is shown. Therefore, there is an effect that it is possible to obtain an image formation apparatus capable of obtaining information from a desired position at a desired time.

Moreover, the destination of obtaining the information is a WWW server, and the fetching-target information is a URL at a WWW site. Therefore, there is an effect that it is possible to obtain an image formation apparatus capable of collecting information from a WWW site and printing this information.

Furthermore, the information is an E-mail. Therefore, there is an effect that it is possible to obtain an image formation apparatus capable of collecting E-mail information and printing this information.

Moreover, the platform comprises a data conversion module which converts information obtained by the information obtaining module into bit map data. Therefore, there is an effect that it is possible to obtain an image formation apparatus capable of executing a conversion to bit map data in common to each application.

Furthermore, the image formation apparatus is loaded with a print application for printing information received from the network via the network interface in response to the operation at the console panel, as one of the plurality of applications, and the information obtaining module obtains the information in response to an instruction from the print application. Therefore, there is an effect that it is possible to obtain an image formation apparatus capable of enabling a user to make request for printing and carry out other various kinds of operations in front of the image formation apparatus.

Moreover, there is provided an application program interface for making it possible to receive a processing request from the application based on a function defined in advance. Therefore, there is an effect that it is possible to obtain an image formation apparatus capable of smoothly coordinating between the application and the platform.

Furthermore, there are formed a control service for interpreting the processing request from the application, and generating a request for obtaining the hardware resources; and a system resource manager for managing one or the plurality of hardware resources, and arbitrating the obtaining request from the control service. Therefore, there is an effect that it is possible to obtain an image formation apparatus capable of sharing the control service in common, not only the mere management and arbitration of hardware resources.

Moreover, the control service is constructed of a plurality of service modules. Therefore, there is an effect that it is possible to obtain an image formation apparatus capable of expanding the function of the control service by adding modules having new services.

Furthermore, the service modules are composed of at least two modules among the information obtaining module, the memory control module, the engine control module, the data conversion module, an operation panel control service for controlling the operation panel, a facsimile control service for controlling the facsimile communication, and a network control service for controlling the network communication. Therefore, there is an effect that it is possible to obtain an image formation apparatus capable of positioning the engine control, the memory control, the panel control, the facsimile control, and the network communications control as the processing common to each application.

The present document incorporates by reference the entire contents of Japanese priority documents, 2000-338217 filed in Japan on Nov. 6, 2000 and 2001-094343 filed in Japan on Mar. 28, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image formation apparatus comprising:
   a network interface configured to connect to a network;
   an information obtaining unit configured to repeatedly obtain information from a predetermined destination on the network via the network interface at each of a plurality of predetermined times;
   a first memory configured to store information identifying the predetermined destination;
   a second memory configured to store information specifying a time at which the information was obtained from the predetermined destination;
   an information memory configured to store the information obtained from the predetermined destination at each of the predetermined times;
   a receiving unit configured to receive a request for printing from the outside;
   a printer engine configured to form an image on a sheet of paper; and
   a printing unit configured to print the information stored in the information memory with the printer engine when there is a request for printing.

2. The image formation apparatus according to claim 1, wherein:
   the destination of obtaining the information is a WWW server, and the information identifying the predetermined destination is a URL at a WWW site.

3. The image formation apparatus according to claim 1, wherein:
   the obtained information is an E-mail.

4. The image formation apparatus according to claim 1, further comprising:
   a data conversion unit configured to convert the information obtained by the information obtaining unit into bit map data before storing the information into the information memory.

5. The image formation apparatus according to claim 1, wherein
   the receiving unit receives the request for printing by operating a console panel of the present apparatus.

6. The image formation apparatus according to claim 1, wherein the information memory stores the information obtained from the network, together with the information identifying the predetermined destination as the information for specifying a destination of obtaining this information and a time of receiving this information, and the receiving unit converts a list of the information on the information identifying the predetermined information and the receiving time stored in the information storage into the HTML format, transmits this converted list to a WWW browser of a user via the network, and receives the request for printing on a display screen of this transmitted data.

7. The image formation apparatus according to claim 1, further comprising an authentication unit which authenticates the user and refuses printing by the printing unit from a specific user.

8. An image formation method comprising:

obtaining information from a predetermined destination network via a network interface for making a connection to the network repeatedly at each of a plurality of predetermined times;

storing information identifying the predetermined destination;

storing information specifying a time at which the information was obtained from the predetermined destination;

storing the information obtained from the predetermined destination at each of the predetermined times; and printing the information obtained from the predetermined destination with a printer engine that forms an image on a sheet of paper, when a request for printing has been received from the outside.

9. The image formation method according to claim 8, wherein the predetermined destination is a WWW server, and the information identifying the predetermined destination is a URL at a WWW site.

10. The image formation method according to claim 8, wherein the obtained information is an E-mail.

11. The image formation method according to claim 8, further comprising:

converting information obtained at the information obtaining step into bit map data before storing the information.

12. The image formation method according to claim 8, wherein the request for printing is received by operating a console panel of the present apparatus.

13. The image formation method according to claim 8, wherein the information storage stores information obtained from the network together with the information identifying the predetermined destination as the information for specifying a destination of obtaining this information and a time of receiving this information, and a list of the information on the information identifying the predetermined destination and the receiving time stored in the information storage is converted into the HTML format, and this converted list is transmitted to a WWW browser of a user via the network, and the request for printing is received on a display screen of this transmitted data.

14. The image formation method according to claim 8, further comprising:

authenticating print requests from a user and refusing printing by the printing unit from a specific user.

15. A computer program embodied on a computer-readable medium containing instructions which when executed on a computer causes the computer to perform:

obtaining information from a predetermined destination network via a network interface for making a connection to the network repeatedly at each of a plurality of predetermined times;

storing information identifying the predetermined destination;

storing information specifying a time at which the information was obtained from the predetermined destination;

storing the information obtained from the predetermined destination at each of the predetermined times; and printing the information obtained from the predetermined destination with a printer engine that forms an image on a sheet of paper, when a request for printing has been received from the outside.

16. An image formation apparatus comprising:

hardware resources including one or more of a display section, a printing section, a storage section, and an image pick-up section that are used for forming an image, and providing user services of an image formation processing using a printer, a copy machine, and a facsimile unit, wherein a platform capable of loading thereon a plurality of applications for providing own image formation processing to each of the user services using the printer, the copying machine, and the facsimile unit, the platform located between the applications and the hardware resources, for controlling the management and execution of the hardware resources that are carried out in common to the plurality of applications that can be loaded at the time of providing the user services, wherein the platform includes, an information obtaining module configured to repeatedly obtain information from a predetermined destination on the network via the network interface at each of a plurality of predetermined times;

a memory control module configured to store the information obtained at each of the plurality of predetermined times by the information obtaining module, information identifying the predetermined destination, and information specifying a time at which the information was obtained from the predetermined destination into the storage section; and an engine control module which prints, using the printing section, information stored in the storage section that has been requested for printing, when the information printing request is received from the network.

17. The image formation apparatus according to claim 16, wherein:

the predetermined destination is a WWW server, and the information identifying a predetermined destination is a URL at a WWW site.

18. The image formation apparatus according to claim 16, wherein:

the obtained information is an E-mail.

19. The image formation apparatus according to claim 16, wherein the platform further includes:

a data conversion module configured to convert information obtained by the information obtaining module into bit map data.

20. The image formation apparatus according to claim 16, wherein the image formation apparatus is loaded with a print application for printing information received from the network via the network interface in response to the operation at the console panel, as one of the plurality of applications, and the information obtaining module obtains the information in response to an instruction from the print application.

21. The image formation apparatus according to claim 16, wherein the platform includes
  an application program interface for making it possible to receive a processing request from the application based on a function defined in advance.

22. The image formation apparatus according to claim 16, wherein the platform further includes,
  a control service configured to interpret the processing request from the application, and generating a request for obtaining the hardware resources; and
  a system resource manager configured to manage one or the plurality of hardware resources, and arbitrating the obtaining request from the control service.

23. The image formation apparatus according to claim 22, wherein the control service is constructed of a plurality of service modules.

24. The image formation apparatus according to claim 16, wherein the service modules are composed of at least two modules among the information obtaining module, the memory control module, the engine control module, the data conversion module, an operation panel control service for controlling the operation panel, a facsimile control service for controlling the facsimile communication, and a network control service for controlling the network communication.

* * * * *